(12) United States Patent
Kim et al.

(10) Patent No.: US 10,353,988 B2
(45) Date of Patent: Jul. 16, 2019

(54) ELECTRONIC DEVICE AND METHOD FOR DISPLAYING WEBPAGE USING THE SAME

(71) Applicant: SAMSUNG ELECTRONICS CO., LTD., Suwon-si, Gyeonggi-do (KR)

(72) Inventors: Hyun-June Kim, Suwon-si (KR); Jun-Young Cho, Gunpo-si (KR); Ryan-Hyun Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 124 days.

(21) Appl. No.: 14/870,520

(22) Filed: Sep. 30, 2015

(65) Prior Publication Data

US 2016/0179766 A1    Jun. 23, 2016

(30) Foreign Application Priority Data

Dec. 17, 2014    (KR) ........................ 10-2014-0182354

(51) Int. Cl.
| | | |
|---|---|---|
| *G06F 17/00* | (2019.01) | |
| *G06F 17/22* | (2006.01) | |
| *G06F 3/048* | (2013.01) | |
| *G06F 3/0482* | (2013.01) | |
| *G06F 3/0485* | (2013.01) | |
| *G06F 3/0488* | (2013.01) | |

(Continued)

(52) U.S. Cl.
CPC ........ *G06F 17/2235* (2013.01); *G06F 3/0481* (2013.01); *G06F 3/0482* (2013.01); *G06F 3/0485* (2013.01); *G06F 3/0488* (2013.01); *G06F 3/04883* (2013.01); *G06F 16/9537* (2019.01); *G06F 16/9562* (2019.01)

(58) Field of Classification Search
CPC .......... G06F 17/30884; G06F 3/04883; G06F 3/0488; G06F 3/017; G06F 3/0486
See application file for complete search history.

(56) References Cited

U.S. PATENT DOCUMENTS

| | | | |
|---|---|---|---|
| 2008/0059906 A1 * | 3/2008 | Toki ...................... | G11B 27/34 715/810 |
| 2008/0313722 A1 | 12/2008 | Cho et al. | |

(Continued)

FOREIGN PATENT DOCUMENTS

| | | |
|---|---|---|
| KR | 2012-0026395 | 3/2012 |
| KR | 10-1424818 | 7/2014 |
| KR | 2014-0100933 | 8/2014 |

OTHER PUBLICATIONS

Search Report and Written Opinion dated Mar. 28, 2016 in counterpart International Patent Application No. PCT/KR2015/013847.

*Primary Examiner* — Ariel Mercardo
(74) *Attorney, Agent, or Firm* — Nixon & Vanderhye P.C.

(57) ABSTRACT

An electronic device and method for displaying a webpage are disclosed. According to an example embodiment, a method for displaying a webpage by an electronic device comprises displaying a first webpage, bookmarking the first webpage being displayed in response to a first gesture input on the first webpage, displaying a second webpage while the first webpage is bookmarked, displaying the second webpage together with the bookmarked first webpage in response to a second gesture input on the second webpage, and scrolling and displaying the bookmarked first webpage in response to a third gesture input on the bookmarked first webpage.

20 Claims, 39 Drawing Sheets

(51) Int. Cl.
  *G06F 3/0481* (2013.01)
  *G06F 16/955* (2019.01)
  *G06F 16/9537* (2019.01)

(56) References Cited

U.S. PATENT DOCUMENTS

| | | |
|---|---|---|
| 2010/0107046 A1 | 4/2010 | Kang et al. |
| 2010/0259562 A1* | 10/2010 | Miyazawa .......... G06F 3/04883 345/684 |
| 2012/0064947 A1 | 3/2012 | Yi et al. |
| 2012/0238325 A1 | 9/2012 | Jung et al. |
| 2012/0317503 A1 | 12/2012 | Noh et al. |
| 2013/0152135 A1 | 6/2013 | Hong et al. |
| 2014/0053066 A1* | 2/2014 | Imamura ............... G06F 17/217 715/251 |
| 2014/0173495 A1 | 6/2014 | Chang et al. |
| 2014/0208233 A1* | 7/2014 | Deeter ................... G06Q 50/01 715/753 |

* cited by examiner

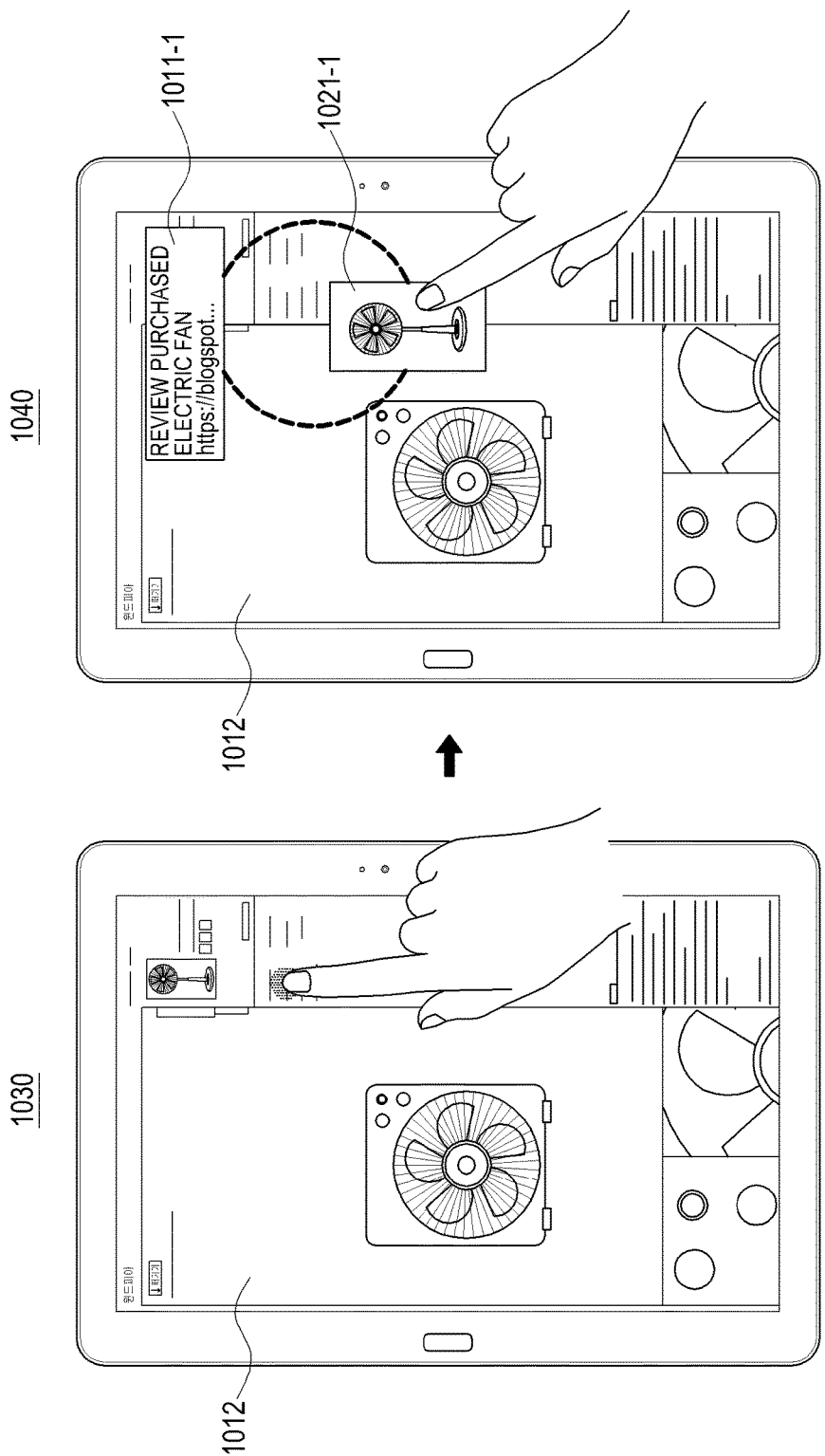

1350

1360

ELECTRONIC DEVICE AND METHOD FOR DISPLAYING WEBPAGE USING THE SAME

CROSS REFERENCE TO RELATED APPLICATION

This application is based on and claims priority under 35 U.S.C. § 119 to a Korean patent application filed in the Korean Intellectual Property Office on Dec. 17, 2014 and assigned Serial No. 10-2014-0182354, the disclosure of which is incorporated by reference herein in its entirety.

BACKGROUND

1. Field

The disclosure relates to electronic devices and methods for displaying webpages using the same, and, for example, to electronic devices and methods displaying webpages bookmarked by a user.

2. Description of Related Art

An electronic device may run a web browser to display webpages on a screen. For example, when a web browser is run, a portable terminal may receive web data from a web server and may load the webpage using the received web data. The web data may include, e.g., hypertext markup language (HTML) data, JAVASCRIPT® data, cascading style sheets (CSS) data, calc style data, image or text or other web contents. The electronic device may parse the web data and may perform a webpage loading process of arranging the web contents on the screen, downloading or rendering the web contents.

While the webpage is displayed, the electronic device may display a new webpage on the screen in response to user input. For example, when a user enters a web address on the address bar of the web browser menu, the electronic device may load a new webpage corresponding to the web address to display the new webpage on the screen. On the other hand, when the user selects a link object included in the webpage, the electronic device may load a new webpage linked to the link object to display on the screen.

The web browser menu provided from the webpage may include icons enabling the redisplay of the webpage that was displayed on the screen. For example, the web browser menu may include a backward icon for displaying the webpage displayed on the screen right before the current webpage is displayed or a forward icon for displaying the webpage displayed on the screen right after the current webpage is displayed. When the user selects the backward icon, the electronic device may display the webpage displayed on the screen immediately before the current webpage is displayed. Similarly, when the user selects the forward icon, the electronic device may display the webpage displayed on the screen immediately after the current webpage is displayed.

Further, the web browser menu may include a favorite icon for the redisplay of webpages bookmarked by the user or webpages visited during a particular period. When the user selects the favorite icon, the electronic device may display a list of webpages that the user visited during a particular period. A list of webpages registered as bookmarks may be displayed in a tree structure.

The electronic device, when receiving a user input for selecting the backward icon or forward icon in the web browser menu, may display only the webpage immediately before or after the current webpage is displayed. Accordingly, as the user visits webpages in a complicated order, the user may have more difficulty redisplaying a desired webpage. In particular, when the user restarts the web browser to display a webpage or displays a webpage on a new tab screen, the webpage might not interwork with the webpage that the user visited and may independently be displayed.

Further, when the electronic device displays a list of webpages that the user visited during a particular period, if the number of webpages the user visited during the particular period increases, the user may be confused in re-searching his desired webpage.

Further, when the electronic device displays a list of webpages registered as bookmarks in a tree structure, the need for the user to remember keywords for the webpages or positions of the webpages in the tree structure may deteriorate the user's ability for quickly searching for his desired webpage.

The above information is presented as background information only to assist with an understanding of the disclosure. No determination has been made, and no assertion is made, as to whether any of the above might be applicable as prior art with regard to the disclosure.

SUMMARY

The disclosure provides an electronic device and method for bringing the user to his desired webpage in a quick and intuitive manner.

By methods or devices according to various example embodiments, the above-described issues may be addressed. Other issues may be addressed in light of the description of the disclosure.

According to an example embodiment, a method for displaying a webpage by an electronic device may comprise displaying a first webpage, bookmarking the first webpage being displayed in response to a first gesture input on the first webpage, displaying a second webpage while the first webpage is bookmarked, displaying the second webpage together with the bookmarked first webpage in response to a second gesture input on the second webpage, and scrolling and displaying the bookmarked first webpage in response to a third gesture input on the bookmarked first webpage.

Bookmarking the first webpage may, for example, comprise storing bookmarked information on the first webpage, and the bookmarked information on the first webpage may be at least one of a domain name of the first webpage, a link address of the first webpage, a thumbnail of the first webpage, a title of the first webpage, and a favicon representing a logo of the first webpage.

In the method for displaying the webpage by the electronic device, a size of an area where the bookmarked first webpage is displayed may be smaller than a size of an area where the second webpage is displayed.

In the method for displaying the webpage by the electronic device, when a third webpage is further bookmarked, displaying the second webpage together with the bookmarked first webpage may comprise displaying the second webpage, the bookmarked first webpage, and identification information of the bookmarked third webpage.

In the method for displaying the webpage by the electronic device, when a first electronic document run by a viewer application is further bookmarked, displaying the second webpage together with the bookmarked first webpage may comprise displaying the second webpage, the bookmarked first webpage, and identification information of the first electronic document together.

In the method for displaying the webpage by the electronic device, when an image is further bookmarked, displaying the second webpage together with the bookmarked first webpage may comprise displaying the second webpage, the bookmarked first webpage, and identification information of the bookmarked image together.

In the method for displaying the webpage by the electronic device, when a first file is further bookmarked, displaying the second webpage together with the bookmarked first webpage may comprise displaying the second webpage, the bookmarked first webpage, and identification information of the first file together.

In the method for displaying the webpage by the electronic device, when another electronic device receives bookmarked information of a first electronic document, displaying the second webpage together with the bookmarked first webpage may comprise displaying the second webpage, the bookmarked first webpage, and identification information of the first electronic document together.

Displaying the second webpage may comprise displaying the second webpage on a new web browser screen by running a new tab of a web browser menu or a new web browser screen by re-running a web browser application.

The method for displaying the webpage by the electronic device may further comprise, in response to a fourth gesture on the bookmarked first webpage while the bookmarked first webpage is displayed, moving a position of the first webpage, varying a size of the first webpage, or displaying a webpage connected to a link object included in the first webpage.

According to an example embodiment, an electronic device displaying a webpage may comprise a display, a sensor configured to sense a user gesture, a memory storing programs, and a processor executing instructions included in at least one of the programs to execute: displaying a first webpage through the display, bookmarking the first webpage being displayed in response to a first gesture input through the sensor on the first webpage, displaying a second webpage through the display while the first webpage is bookmarked, displaying the second webpage together with the bookmarked first webpage through the display in response to a second gesture input through the sensor on the second webpage, and scrolling and displaying, through the display, the bookmarked first webpage in response to a third gesture input through the sensor on the bookmarked first webpage.

The processor, when bookmarking the first webpage, may execute instructions to store bookmarked information on the first webpage, and the bookmarked information on the first webpage may be at least one of a domain name of the first webpage, a link address of the first webpage, a thumbnail of the first webpage, a title of the first webpage, and a favicon representing a logo of the first webpage.

The processor, when the second webpage together with the bookmarked first webpage is displayed, may execute instructions so that a size of an area where the bookmarked first webpage is displayed is smaller than a size of an area where the second webpage is displayed.

The processor, when a third webpage is further bookmarked, may execute instructions to display together the second webpage, the bookmarked first webpage, and identification information of the bookmarked third webpage.

The processor, when a first electronic document run by a viewer application is further bookmarked, may execute instructions to display the second webpage, the bookmarked first webpage, and identification information of the bookmarked first electronic document together.

The processor, when an image is further bookmarked, may execute instructions to display the second webpage, the bookmarked first webpage, and identification information of the bookmarked image together.

The processor, when a file is further bookmarked, may execute instructions to display the second webpage, the bookmarked first webpage, and identification information of the bookmarked file together.

The processor, when another electronic device receives bookmarked information on the first electronic document, may execute instructions to display the second webpage, the bookmarked first webpage, and identification information of the first electronic document together.

The processor, when bookmarking the second webpage, may execute instructions to display the second webpage on a new web browser screen by running a new tab of a web browser menu or a new web browser screen by re-running a web browser application.

The processor, in response to a fourth gesture input through the sensor on the bookmarked first webpage while the bookmarked first webpage is displayed, may execute instructions to move a position of the first webpage, vary a size of the first webpage, or display a webpage connected to a link object included in the first webpage.

Other aspects, advantages, and salient features of the disclosure will become apparent to those skilled in the art from the following detailed description, which, taken in conjunction with the annexed drawings, discloses example embodiments.

BRIEF DESCRIPTION OF THE DRAWINGS

A more complete appreciation of the disclosure and many of the attendant aspects thereof will be apparent by reference to the following detailed description when considered in conjunction with the accompanying drawings, in which like reference numerals refer to like elements, and wherein:

FIGS. 10A and 10B are views illustrating a process of sharing bookmarked information between electronic documents and images;

Throughout the drawings, like reference numerals will be understood to refer to like parts, components, and structures.

DETAILED DESCRIPTION

Figure 1:
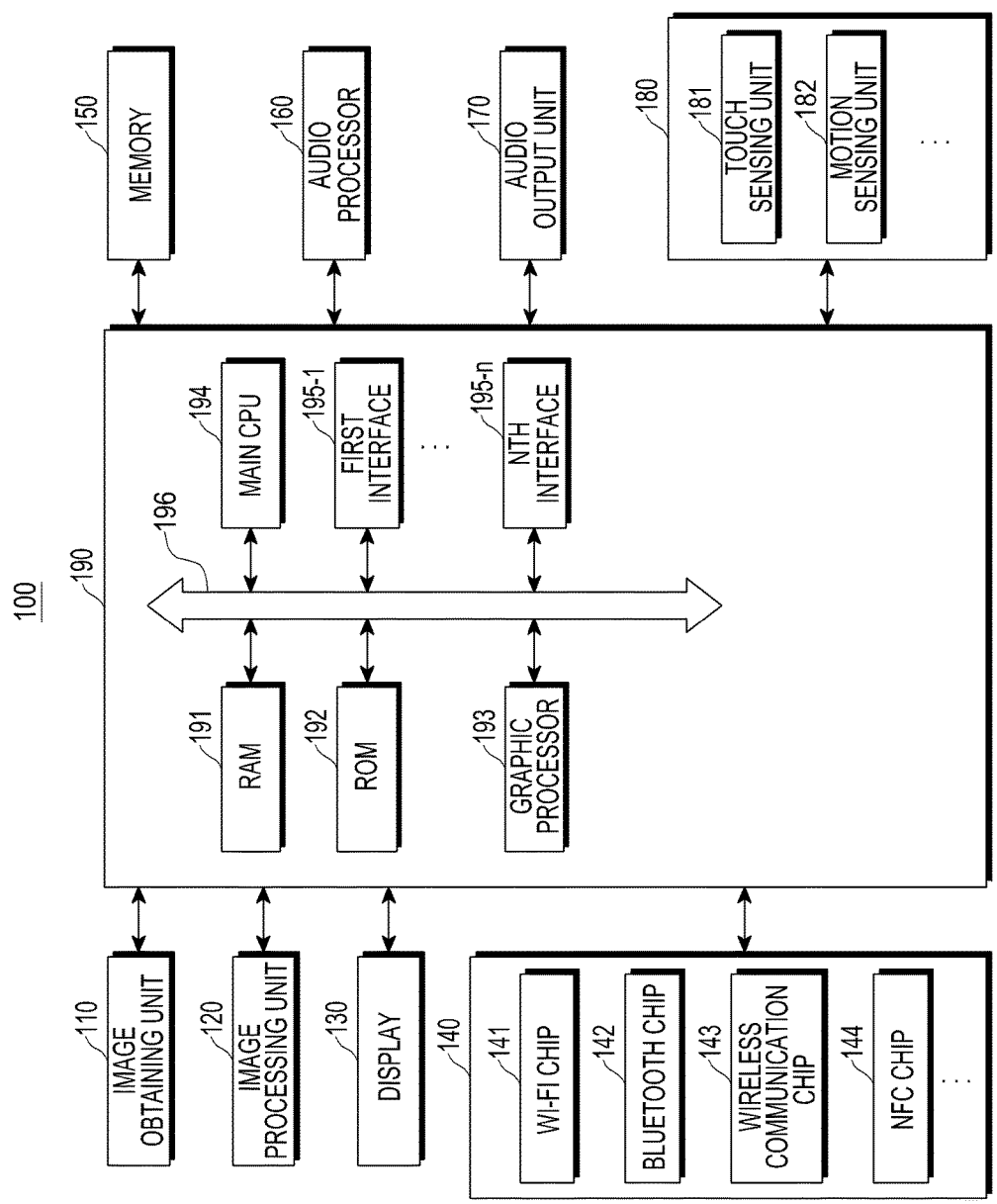
FIG. 1 is a block diagram illustrating a configuration of an electronic device.

The terms used herein are briefly described, and the disclosure is then described in detail.

For use in example embodiments of the disclosure, common terms widely used as possible have been chosen considering functions in the disclosure, but the terms may be varied depending on the intent of one of ordinary skill in the art or case laws or the advent of new technologies. In certain cases, some terms may be arbitrarily selected by the applicant, and in such case, their detailed definitions may be given in the relevant parts thereof. Accordingly, the terms used herein should be determined based on their meanings and the overall disclosure, rather than by the terms themselves.

Various changes may be made to the disclosure, and the disclosure may come with a diversity of example embodiments. Some example embodiments of the disclosure are shown and described in connection with the drawings. However, it should be appreciated that the disclosure is not limited to the example embodiments, and all changes and/or equivalents or replacements thereto also belong to the scope of the disclosure. When determined to make the subject matter of the disclosure unclear, the detailed description of the known art or functions may be skipped.

The terms "first" and "second" may be used to describe various components, but the components should not be limited by the terms. The terms are used only to distinguish one component from another.

It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

In embodiments of the disclosure, the "unit," "module" or "part" may perform at least one function or operation and may be implemented in hardware, software, or a combination thereof. Further, a plurality of "modules" or a plurality of "parts" may be integrated in at least one module and may be implemented in at least one processor (not shown), unless particularly required to be implemented in a particular type of hardware.

As described herein, and will be appreciated by those skilled in the art, the described systems, methods and techniques may be implemented in digital electronic circuitry including, for example, electrical circuitry, logic circuitry, hardware, computer hardware, firmware, software, or any combinations of these elements. Apparatus embodying these techniques may include appropriate input and output devices, a computer processor, and a computer program product tangibly embodied in a non-transitory machine-readable storage device or medium for execution by a programmable processor. A process embodying these techniques may be performed by a programmable hardware processor executing a suitable program of instructions to perform desired functions by operating on input data and generating appropriate output. The techniques may be implemented in one or more computer programs that are executable on a programmable processing system including at least one programmable processor coupled to receive data and instructions from, and transmit data and instructions to, a data storage system, at least one input device, and at least one output device. Each computer program may be implemented in a high-level procedural or object-oriented programming language or in assembly or machine language, if desired; and in any case, the language may be compiled or interpreted language. Suitable processors include, by way of example, both general and special purpose microprocessors. Generally, a processor will receive instructions and data from a rea-only memory and/or a random access memory. Non-transitory storage devices suitable for tangibly embodying computer program instructions and data include all forms of computer memory including, but not limited to, non-volatile memory, including by way of example, semi-conductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; Compact Disc Read-Only Memory (CD-ROM), digital versatile disk (DVD), Blu-ray disk, universal serial bus (USB) device, memory card, or the like. Any of the foregoing may be supplemented by, or incorporated in, specially designed hardware or circuitry including, for example, application-specific integrated circuits (ASICs) and digital electronic circuitry. Thus, methods for providing image contents described above may be implemented by a program including an executable algorithm that may be executed in a computer, and the program may be stored and provided in a non-transitory computer readable medium In embodiments of the disclosure, when an element is "connected" with another element, the element may be "directly connected" with the other element, or the element may be "electrically connected" with the other element via an intervening element. When an element "includes" another element, the element may further include the other element, rather excluding the other element, unless particularly stated otherwise.

Example embodiments of the disclosure are now described with reference to the accompanying drawings. However, the disclosure may be implemented in other various forms and is not limited to the example embodiments set forth herein. For clarity of the disclosure, irrelevant parts are removed from the drawings, and similar reference denotations are used to refer to similar elements throughout the specification.

Further, in example embodiments of the disclosure, the user input may, for example, include, but is not limited to, at least one of a touch input, a gesture input, a bending input, a voice input, a button input, a multimodal input, etc.

Further, in example embodiments of the disclosure, the "touch input" means the user input of the user touching the display or cover to control the device. Further, the "touch input" may include a touch without contacting the display or while spaced apart at a predetermined distance or more (e.g., floating or hovering). The touch input may include, e.g., a touch-and-hold input, a touch-and-release tap input, and a double tap input.

Further, in example embodiments of the disclosure, the "gesture input" means a user input of the user, after touching the display or cover to control the device, moving the touch by a predetermined distance or more and then releases the touch. Examples of the gesture input may include a panning gesture, a flicking gesture, a touch-and-drag gesture, and a pinch gesture. Further, the gesture input may include a user input of drawing a predetermined symbol mapped with a particular function. Examples of the gesture input may include a circle gesture, a check ("√") gesture, a 'Z' gesture, and an "N" gesture. For example, when receiving a user input for performing a circle gesture, the electronic device may perform a function of bookmarking the electronic screen being displayed. Further, when making a user input for performing a check gesture, the electronic device may, for example, perform a function for bringing up a bookmarked electronic screen.

Further, in example embodiments of the disclosure, the "button input" may, for example, include an input of the user using a physical button in the device to control the device.

Further, in example embodiments of the disclosure, the "motion input" may, for example, include a motion that the user applies to the device for controlling the device. For example, the motion input may include an input of the user rotating, tilting, or moving up and down the device.

Further, in example embodiments of the disclosure, the "multimodal input" may, for example, include a combination of at least two or more ways to input. For example, the device may receive the user's touch input and motion input or the user's touch input and voice input.

Further, in example embodiments of the disclosure, the "application" may, for example, refer to a series of computer program sets arranged to perform a particular task. In example embodiments of the disclosure, various applications may be used. Examples of the application may, for example, include, but is not limited to, a game application, a movie playing application, a map application, a memo application, a calendar application, a phone book application, a broadcast application, a workout supporting application, a payment application, a picture folder application, a camera application, a web browser application, an editing application, etc.

Further, in example embodiments of the disclosure, the user interaction (UI) element may, for example, include an element that may interact with the user and may offer a visual, auditory, or olfactory feedback based on the user input. The UI element may be displayed, associated with at least one of an image, text, and motion picture, or when there is an area on the screen that does not display the above-described information but may provide a feedback responsive to the user input, this area may be called the UI element.

Hereinafter, example embodiments of the disclosure are described with reference to the accompanying drawings.

FIG. 1 is a block diagram illustrating a configuration of an electronic device.

The configuration of the electronic device 100 shown in FIG. 1 may be applicable to various types of devices, such as, e.g., a mobile phone, a tablet personal computer (PC), a personal digital assistants (PDA), a moving picture experts group layer-3 (MP3) player, a kiosk, an electronic picture frame, a navigation device, a wearable device, such as a wrist watch, or a head-mounted display (HMD), etc.

As illustrated in FIG. 1, the electronic device 100 may, for example, include at least one of an image obtaining unit 110, an image processing unit 120, a display 130, a communication unit 140, a memory 150, an audio processor 160, an audio output unit 170, a sensing unit 180, and a processor 190. The configuration of the electronic device 100 shown in FIG. 1 is merely an example, and is not necessarily limited to the block diagram. Accordingly, some of the elements may be omitted or modified or other elements may be added depending on the type or purpose of the electronic device 100.

The image obtaining unit 110 may obtain image data through various sources. For example, the image obtaining unit 110 may include circuitry configured to receive broadcast data from an external broadcast station, may receive real-time video on demand (VOD) data from an external server, and may receive image data from an external device, or the like.

The image obtaining unit 110 may be configured to obtain image data by image-capturing an external environment. For example, the image obtaining unit 110 may be implemented as a camera for image-capturing the external environment. In this case, the image obtaining unit 110 may include a lens (not shown) through which an image passes and an image sensor (not shown) sensing the image passing through the lens. The image sensor (image) may be implemented as a charge coupled device (CCD) image sensor or a complementary metal-oxide-semiconductor (CMOS) image sensor, or the like. The image data obtained through the image obtaining unit 110 may be processed in the image processor 120.

The image processor 120 is an element or circuitry that performs processing on the image data received from the image obtaining unit 110. The image processor 120 may perform various processes on the image data, such as decoding, scaling, noise filtering, frame rate conversion, resolution conversion, etc.

The display 130 displays at least one of, for example, video frames processed on the image data by the image processor 120 or various screens generated in a graphic processor 193.

There are no limitations on the way to implement the display 130. For example, the display 130 may be implemented as various types of displays, such as a liquid crystal display (LCD), an organic light emitting diode (OLED) display, an active-matrix organic light emitting diode (AM-OLED) display, a plasma display panel (PDP) display, or the like. The display 130 may further include additional components depending on its implementations. For example, when the display 130 is an LCD display, the display 130 may include an LCD display panel (not shown), a backlight unit (not shown) supplying light to the LCD display panel, and a panel driving board (not shown) driving the panel (not shown). Further, the display 130 may be combined with a touch sensing unit or touch sensing circuitry 181 of the sensing unit 180 to be provided, for example, as a touchscreen. In this case, an electronic document may be displayed through the touchscreen, and a user input may be sensed through the touchscreen.

The display 130 may be coupled with at least one of a front area, a side area, and a rear area of the electronic device 100 in the form of a bendable display. The bendable display may, for example, be implemented as a flexible display or a non-flexible, normal display. For example, the bendable display may be implemented by coupling a plurality of flat displays to each other.

When a bendable display is implemented as a flexible display, the flexible display may be bent, warped, or rolled without damage through a sheet-like, thin and flexible board. The flexible display may be manufactured of a plastic board as well as a glass board commonly used. When the plastic board comes in use, a low-temperature producing processor, rather than an existing manufacturing processor, may be used to prevent damage to the board. Further, the flexible display may replace the glass board covering the liquid crystal in, e.g., the LCD, OLED display, AM-OLED display, PDP display, or the like, with a plastic film, allowing flexibility that enables it to be folded or unfolded. Such a flexible display may be lightweight and thin, impact-resistant, and bendable or warpable, and may be manufactured in various forms.

The communication unit 140 is a component or circuitry that performs communication with various types of external devices depending on various types of communication schemes. The communication unit 140 may, for example, include at least one of a wireless fidelity (Wi-Fi) chip 141, a Bluetooth chip 142, a wireless communication chip 143, and a near-field communication (NFC) chip. The processor 190 may conduct communication with various external devices using the communication unit 140.

In particular, the Wi-Fi chip 141 and the Bluetooth chip 142 may perform communication in a Wi-Fi scheme and a Bluetooth scheme, respectively. When the Wi-Fi chip 141 or Bluetooth chip 142 are in use, various connection information such as a service set identifier (SSID) and session key may be first communicated, and the same is used to connect the communication to communicate various information. The wireless communication chip 143 may, for example, include a chip that performs communication as per various communication standards, such as institute of electrical and electronics engineers (IEEE), ZigBee, 3rd generation (3G), 3rd generation partnership project (3GPP), long term evolution (LTE), etc. The NFC chip 144 may, for example, include a chip that operates in an NFC scheme using the 13.56 MHz band among various radio frequency identification (RF-ID) frequency bands such as 135 kHz, 13.56 MHz, 433 MHz, 860~960 MHz, and 2.45 GHz.

The memory 150 may store various programs and data necessary for the operation of the electronic device 100. The memory 150 may, for example, be implemented as a non-volatile memory, a volatile memory, a flash memory, a hard disk drive (HDD) a solid state drive (SSD), or the like. The memory 150 is accessed by the processor 190, and data read/record/modify/delete/update may be carried out by the processor 190. As used herein, the term "memory" may include a read-only memory (ROM) (not shown) or a random access memory (RAM) (not shown) in the processor 190 or a memory card (not shown) (e.g., a micro secure digital (SD) card, or a Memory Stick™) mounted in the electronic device 100. For example, the memory 150 may store a program or data for configuring various screens to be displayed on a display area.

Figure 2:
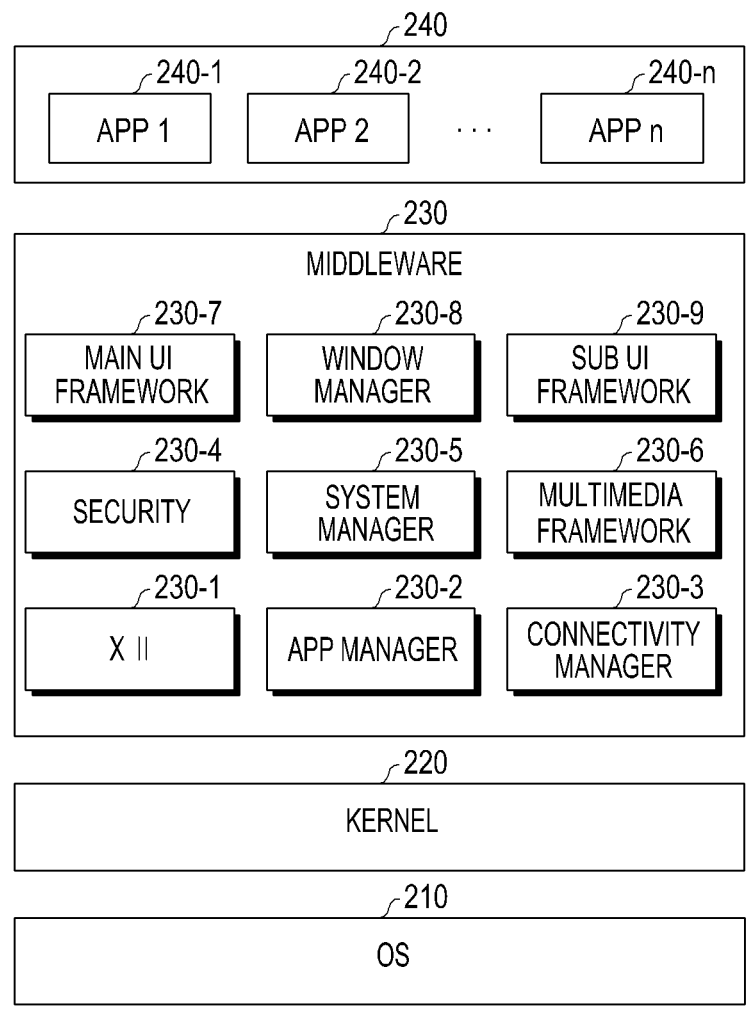
FIG. 2 is a view illustrating a structure of software stored in an electronic device.

The structure of software stored in the electronic device 100 is described with reference to FIG. 2. Referring to FIG. 2, the memory 150 may store software including an operating system (OS) 210, a kernel 220, middleware 230, and application(s) 240.

The OS 210 may, for example, perform a function of controlling and managing an overall operation of the hardware. That is, the OS 210 is a layer that is in charge of basic functions such as hardware management, memory or security.

The kernel 220 plays a role as a pathway that transfers various signals including a touch signal sensed by the sensing unit 180 to the middleware 230.

The middleware 230 includes, for example, various software modules controlling the operation of the electronic device 100. The middleware 230 may, for example, include an X11 module 230-1, an APP manager 230-2, a connectivity manager 230-3, a security module 230-4, a system manager 230-5, a multimedia framework 230-6, a main UI framework 230-7, a window manager 230-8, and a sub UI framework 230-9.

The X11 module 230-1 may, for example, be a module that receives various event signals from various pieces of hardware provided in the electronic device 100. Here, various events may be set, such as an event that a user gesture is sensed, an event that a system alarm occurs, and an event that a particular program is run or terminated.

The APP manager 230-2 may, for example, be a module that manages the running state of various applications 240 installed in the memory 150. The APP manager 230-2, when sensing an application running event from the X11 module 230-1, calls in and runs an application corresponding to the event.

The connectivity manager 230-3 may, for example, be a module for supporting a wired or wireless network connection. The connectivity manager 230-3 may include sub modules such as a DNET module and an UPnP module.

The security module 230-4 may, for example, be a module supporting, e.g., certification, permission, or secure storage for the hardware.

The system manager 230-5 may, for example, monitor the state of each component in the electronic device 100 and provide the results of monitoring to other modules. For example, when the battery is insufficient, when an error occurs, or when the communication is disconnected, the system manager 230-5 provides a monitored result to the main UI framework 230-7 or sub UI framework 230-9 to output a notification message or sound.

The multimedia framework 230-6 may, for example, be a module for playing multimedia content stored in the electronic device 100 or provided from an external source. The multimedia framework 230-6 may include a player module, a camcorder module, and a sound processing module. Accordingly, the multimedia framework 230-6 may perform an operation that plays various multimedia contents to generate and play a screen and sound.

The main UI framework 230-7 may, for example, be a module for providing various UIs to be displayed on a main area of the display 130, and the sub UI framework 230-9 is a module for providing various UIs to be displayed on a sub area. The main UI framework 230-7 and the sub UI framework 230-9 may include an image compositor module constituting various UI elements, a coordinate compositor module computing a coordinate where a UI element is to be displayed, a rendering module rendering a configured UI element at a computed coordinate, and a 2-dimensional (2D)/3-dimensional (3D) UI toolkit providing a tool for configuring a 2D or 3D UI.

The window manager 230-8 may, for example, sense a touch event using the user's body or pen or other input events. The window manager 230-8, when sensing such an event, transfers the event signal to the main UI framework 230-7 or sub UI framework 230-9, performing an operation corresponding to the event.

There may be stored other various program modules, such as, a writing module that, when the user touches and drags the screen, draws a line according to the trajectory of the drag and an angle computation module for computing a pitch angle, roll angle, and yaw angle based on a value sensed by a motion sensor 182.

The application module 240 includes applications 240-1 to 240-n to support various functions. For example, the application module 240 may include program modules for providing various services, such as a navigation program module, a game module, an electronic book module, a calendar module, an alarm management module, and a web browser module. The applications may be installed as default or may be arbitrarily installed by the user while used by the user. The main central processing unit (CPU) 194, when a UI element is selected, may run an application corresponding to the selected UI element using the application module 240.

The software structure shown in FIG. 2 is merely an example and should not be limited thereto. For example, some of the elements may be omitted or modified or other elements may be added depending on the type or purpose of the electronic device 100.

Referring back to FIG. 1, the audio processor 160 is a component that processes audio data of an image content. The audio processor 160 may conduct various processes such as decoding, amplifying or noise filtering audio data. The audio data processed by the audio processor 160 may be output to the audio output unit 170.

The audio output unit 170 is a component or circuitry that outputs various notification sounds or sound messages as well as various audio data that have undergone various processing tasks such as decoding, amplifying or noise filtering by the audio processor 160. In particular, the audio output unit 170 may be implemented as a speaker, and this is merely an example, and the audio output unit 170 may be implemented as an output terminal that may output audio data.

The sensing unit 180 may include various sensors. The sensing unit 180 may include at least one device of all types of sensing devices that may sense a variation in state of the electronic device 100. For example, the sensing unit 180 may include at least one sensor of various sensing devices, such as a touch sensor, an acceleration sensor, a gyro sensor, an illuminance sensor, a proximity sensor, a pressure sensor, a noise sensor (e.g., a microphone), a video sensor (e.g., a camera module), and a timer.

The sensing unit 180 may include a touch sensing unit 181 and a motion sensing unit 182 depending on sensing purposes, but is not limited thereto. The sensing unit 180 may further include various modules or circuitry depending on sensing purposes. The differentiation depending on sensing purposes does not mean physical differentiation. At least one or more sensors may be combined to serve as the modules 181 and 182. Further, depending on implementations, some of the components or functions of the sensing unit 180 may be included in the processor 190.

For example, the touch sensing unit 181 may sense the user's touch input or gesture input using a touch sensor attached on the rear surface of the display panel. In this case, the processor 190 may obtain information, such as the coordinate and time of the touch, from the touch sensing unit 181 to determine the type of the touch input or gesture input. The type of the touch input or gesture input may be determined using the touch coordinate and time obtained by the touch sensing unit 181, and information on the determined type of touch input or gesture input may be transmitted to the processor 190.

The motion sensing unit 182 may include circuitry configured to sense a motion (e.g., rotation or tilting) of the electronic device 100 using at least one of the acceleration sensor, tilt sensor, gyro sensor, and 3-axis magnetic sensor. The motion sensing unit 182 may transfer the generated electrical signal to the processor 190. As an example, the motion sensing unit 182 measures an acceleration in which the motion acceleration of the electronic device 100 is summed with the gravity acceleration. However, the motion sensing unit 182 may measure only the gravity acceleration when there is no motion acceleration.

The processor 190 (or a controller) is configured to control the overall operation of the electronic device 100 using various programs stored in the memory 150.

The processor 190 may, for example, include a RAM 191, a ROM 192, a graphic processor 193, a main CPU 194, first to nth interfaces 195-1 to 195-n, and a bus 196. The RAM 191, ROM 192, graphic processor 193, main CPU 194, and the first to nth interfaces 195-1 to 195-n may be connected with one another via the bus 196.

The RAM 191 stores an OS and application programs. Specifically, the RAM 191 stores the OS when the electronic device 100 is booted, and may store various application data selected by the user.

The ROM 192 stores a set of commands for system booting. When a turn-on command is entered to feed power, the main CPU 194 copies the OS stored in the memory 150 to the RAM 191 in response to the command stored in the ROM 192 and runs the OS to boot the system. When the booting is done, the main CPU 194 copies various application programs stored in the memory 150 to the RAM 191 and runs the application programs copied to the RAM 191 to perform various operations.

The graphic processor 193 generates a screen including various objects, such as items, images, and text, using a computation unit (not shown) and a rendering unit (not shown). Here, the computation unit may be a component that computes attribute values, such as the coordinate, shape, size, and color in which each object is to be displayed, according to the layout of the screen using a control command received from the sensing unit 180. The rendering unit may be a component that generates various layout screens including objects based on attribute values computed by the computation unit. A screen generated by the rendering unit may be displayed in a display area of the display 130.

The main CPU 194 accesses the memory 150 and performs booting using the OS stored in the memory 150. The main CPU 194 conducts various operations using various programs, contents, and data stored in the memory 150.

The first to nth interfaces 195-1 to 195-n are connected with the above-described various components. One of the first to nth interfaces 195-1 to 195-n may be a network interface that is connected to an external device through a network.

For example, while a first webpage is displayed, the processor 190 may bookmark the first webpage being displayed in response to a first gesture input to the first webpage through the sensing unit 180. While a second webpage is displayed with the first webpage bookmarked, the processor 190 may display the second webpage, together with the bookmarked first webpage, in response to a second gesture input to the second webpage through the sensing unit 180. Responsive to a third gesture input to the first webpage through the sensing unit 180, the processor 190 may control the display 130 to scroll and display the first webpage.

FIGS. 3A to 3E are views illustrating an example process of displaying a webpage.

Figure 3A:
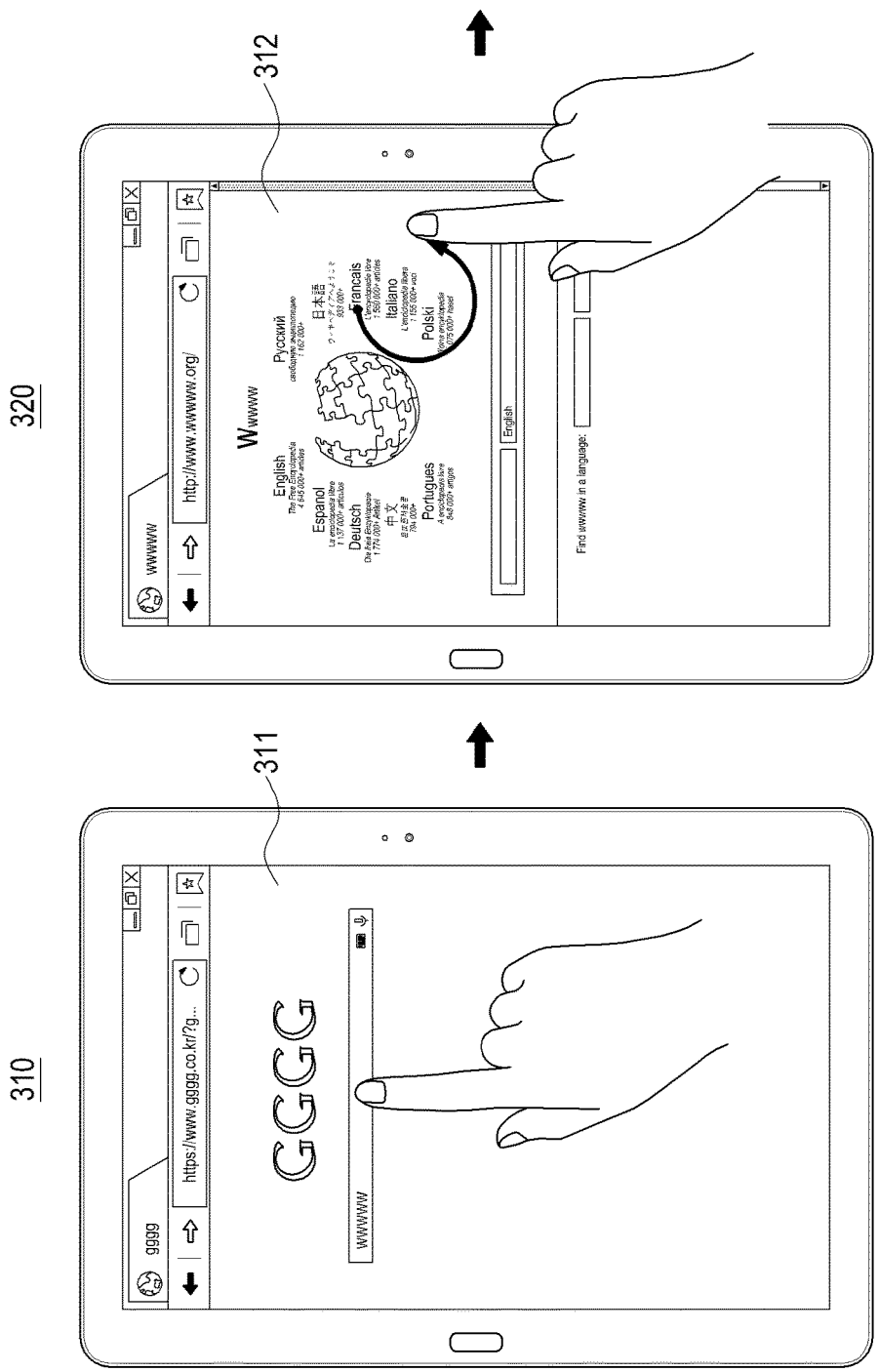
FIGS. 3A to 3E are views illustrating a process of displaying a webpage.

Referring to FIG. 3A, the processor 190 may be configured to control the display 130 to run a web browser so that a first webpage 311 is displayed on the web browser screen as illustrated in operation 310 of FIG. 3A. Next, the sensing circuitry or unit 180 may sense a user input for displaying a second webpage 312. The user input may, for example, bean input of a keyword related to the second webpage 312 in an input field of the first webpage 311.

Responsive to the user input, the processor 190 may be configured to control the display 130 to display the second webpage 312 on the web browser screen as illustrated in operation 320 of FIG. 3A. Next, the sensing unit 180 may sense a user input for bookmarking the second webpage 312. As an example, the user input may be a gesture input of drawing an open curved line or a closed circle on the second webpage 312 as a gesture input previously defined. The user input may be a touch input, e.g., a touch-and-hold input that maintains a touch for a predetermined time. The user input may be a voice input previously defined, e.g., a voice speaking out "set a bookmark."

In response to the user input, the processor 190 may be configured to cause the second webpage 312 to be bookmarked. For example, the processor 190 may store the bookmarked information on the second webpage 312. The bookmarked information on the second webpage 312 may, for example, beat least one of a domain name, a link address, a thumbnail, a title, and a favicon representing a logo of the webpage.

Figure 3B:
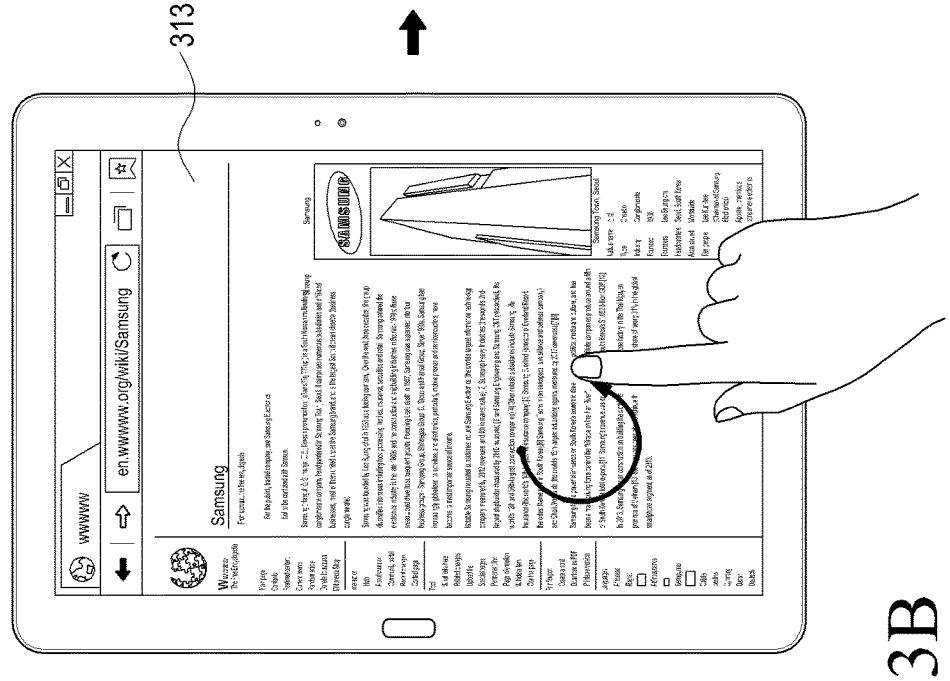
Figure 3B:
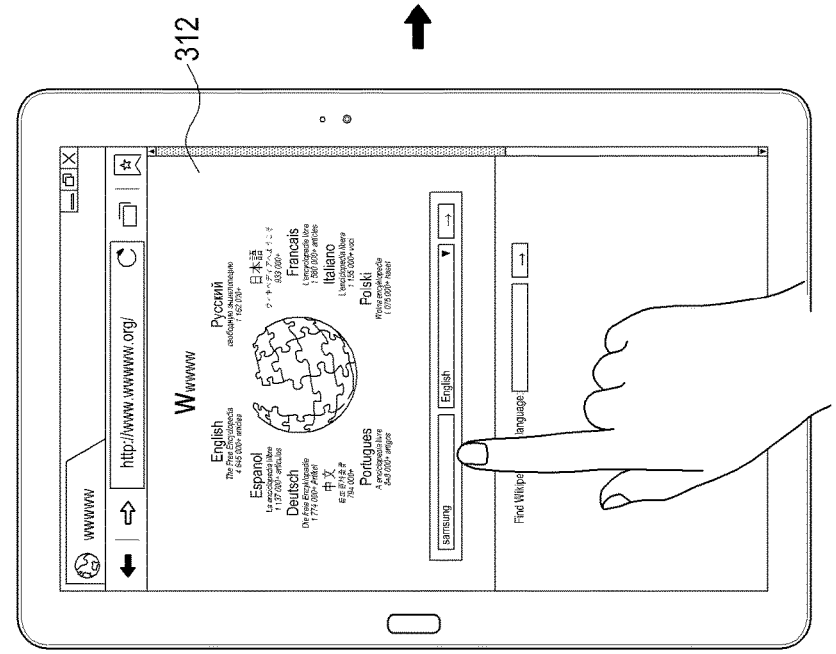

Next, as illustrated in operation 330 of FIG. 3B, while the second webpage 312 continues to be displayed, the sensing unit 180 may sense a user input to display a third webpage 313. The user input may, for example, bean input of a keyword related to the third webpage 313 in an input field of the second webpage 312.

Responsive to the user input, the processor 190 may be configured to control the display 130 to display the third webpage 313 on the web browser screen as illustrated in operation 340 of FIG. 3B. Next, the sensing unit 180 may sense a user input for bookmarking the third webpage 313. For example, the user input may be a gesture input previously defined on the third webpage 313.

Figure 3C:
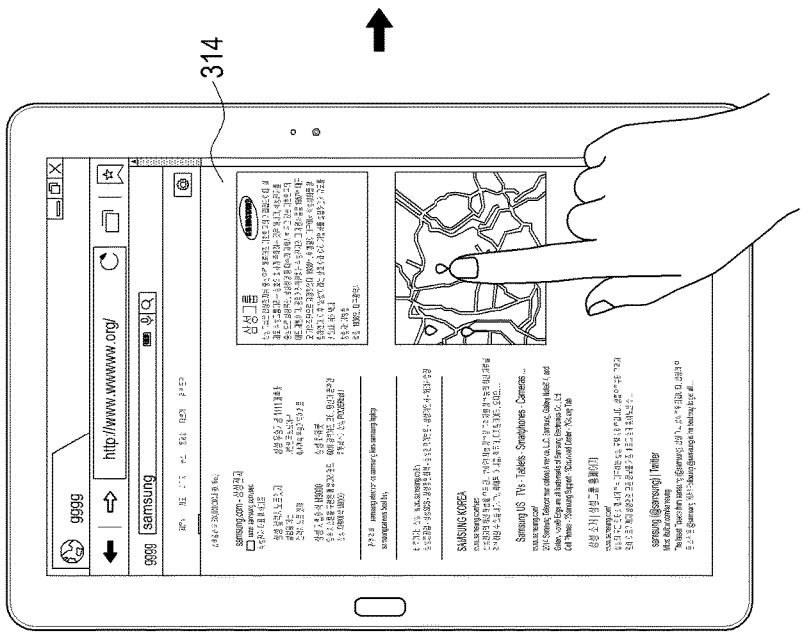
Figure 3C:
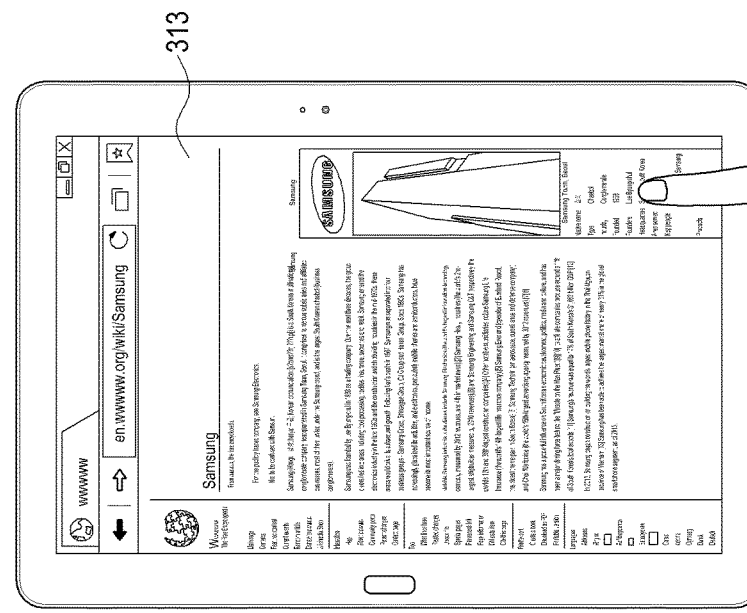

Next, as in operation 350 of FIG. 3C, while the third webpage 313 continues to be displayed, the sensing unit 180 may sense a user input to display a fourth webpage 314. The user input may be, e.g., a user input of selecting a link object included in the third webpage 313.

Figure 3D:
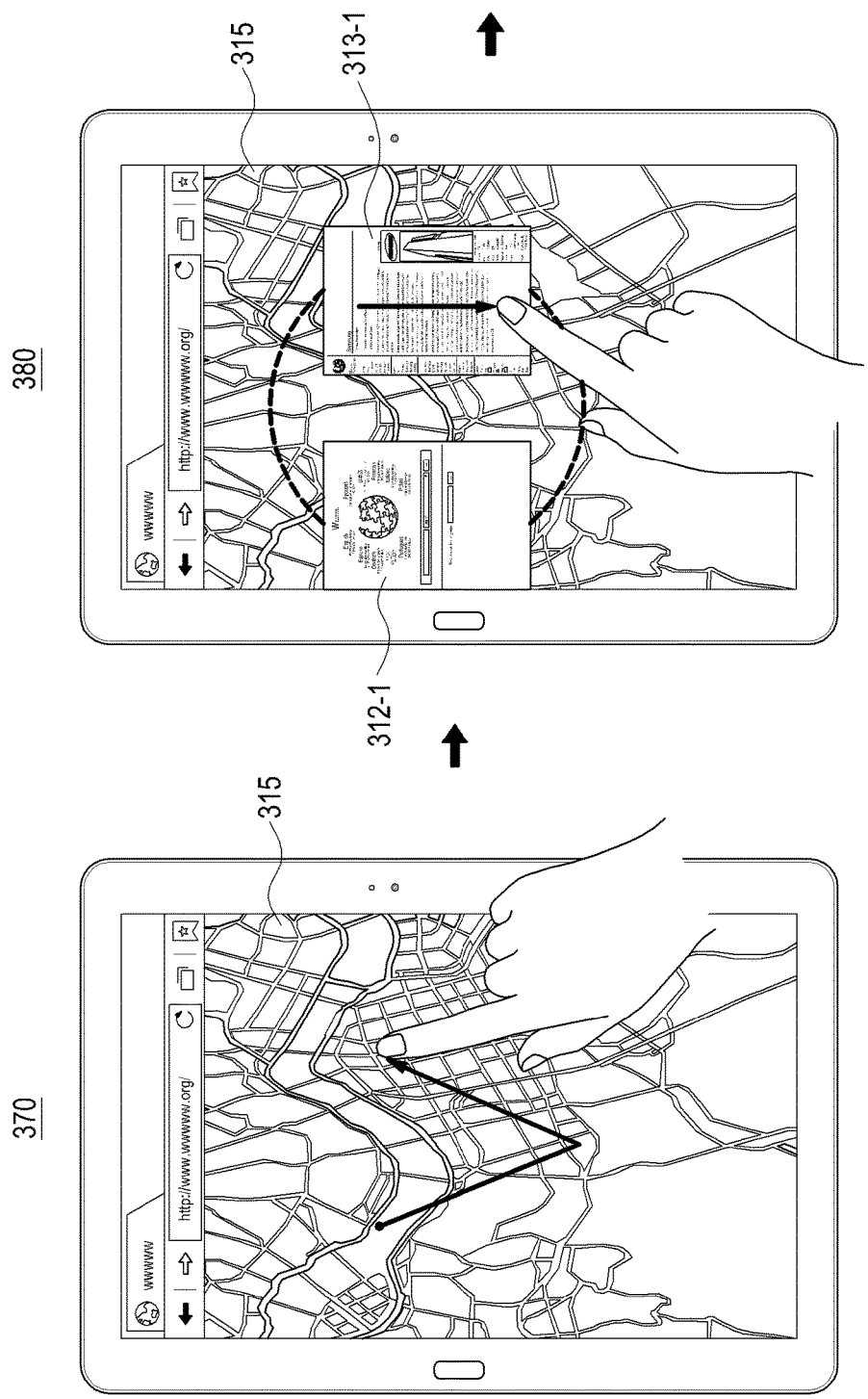

Responsive to the user input, the processor 190 may be configured to control the display 130 to display the fourth webpage 314 on the web browser screen as illustrated in operation 360 of FIG. 3D. Next, the sensing unit 180 may sense a user input for displaying a fifth webpage 315. The user input may, for example, be a user input of selecting a link object included in the fourth webpage 314.

Responsive to the user input, the processor 190 may be configured to control the display 130 to display the fifth webpage 315 on the web browser screen as in operation 370 of FIG. 3D. Next, the sensing unit 180 may sense a user input to display identification information on at least one of the bookmarked webpages. As an example, the user input may be a gesture input of drawing a check ('✓') or "V" on the second webpage 315 as a gesture input previously defined. The user input may be a touch input, e.g., a touch-and-hold input that maintains a touch for a predetermined time. The user input may be a voice input previously defined, e.g., a voice speaking out "bring up a bookmark." When a popup screen including a list of the bookmarked webpages is displayed, the user input may be a user input of selecting the fifth webpage 315 from the list of the bookmarked webpages. Even without the user input, when the fifth webpage 315 is displayed, identification information on at least one of the bookmarked webpages may be automatically displayed.

In response to the user input, as illustrated in operation 380 of FIG. 3D, the processor 190 may be configured to control the display 130 to display at least one of the identification information 312-1 of the bookmarked second webpage and identification information of the bookmarked third webpage 313-1. In this case, the identification information 312-1 of the second webpage may be at least one of the second webpage whose display area has been shrunken, a thumbnail of the second webpage, a title of the second webpage, a favicon representing a logo of the second webpage, or part of the second webpage, etc. Further, the identification information 313-1 of the third webpage may be at least one of the third webpage whose display area has been shrunken, a thumbnail of the third webpage, a title of the third webpage, a favicon representing a logo of the third webpage, or part of the third webpage, etc.

For example, the size of the area where the shrunken third webpage 313-1 is displayed may be smaller than the size of the area where the fifth webpage 315 is displayed. Next, the sensing unit 180 may sense a user input to scroll the shrunken third webpage 313-1. For example, the user input may be a touch-and-drag gesture on the shrunken third webpage 313-1. In this case, the processor 190 may be configured to control the display 130 to scroll and display the shrunken third webpage 313-1 in response to the user input as in operation 390 of FIG. 3E.

As another example, the sensing unit 180 may sense a user input to increase the size of the identification information 313-1 of the third webpage. For example, the user input may be a touch-and-drag gesture of touching and dragging an edge of the identification information 313-1 of the third webpage. In this case, the processor 190 may be configured to increase the size of the identification information 313-1 on the third webpage in response to the user input.

As another example, the sensing unit 180 may sense a user input to move the identification information 313-1 of the third webpage. For example, the user input may be a user gesture of dragging a touch on the third webpage with the touch maintained on the third webpage and releasing the touch at a predetermined position. In this case, the processor 190 may be configured to move the identification information 313-1 of the third webpage to the touch releasing position in response to the user input.

As another example, the sensing unit 180 may sense a user input of selecting a link object included in the identification information 313-1 on the third webpage. For example, the user input may be a touch input of tapping the link object. In this case, the processor 190 may be configured to control the display 130 to display the webpage linked to the link object selected on the area where the identification information 313-1 of the third webpage is displayed in response to the user input.

Figure 3E:
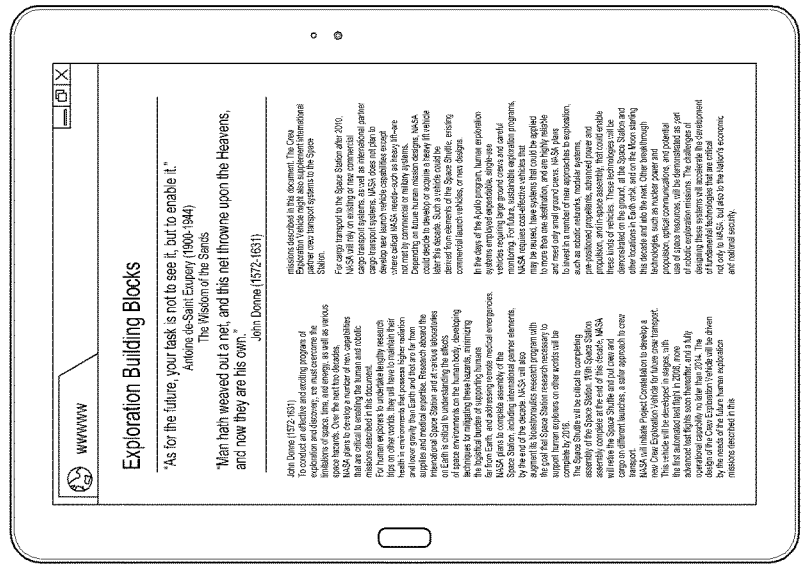
Figure 3E:
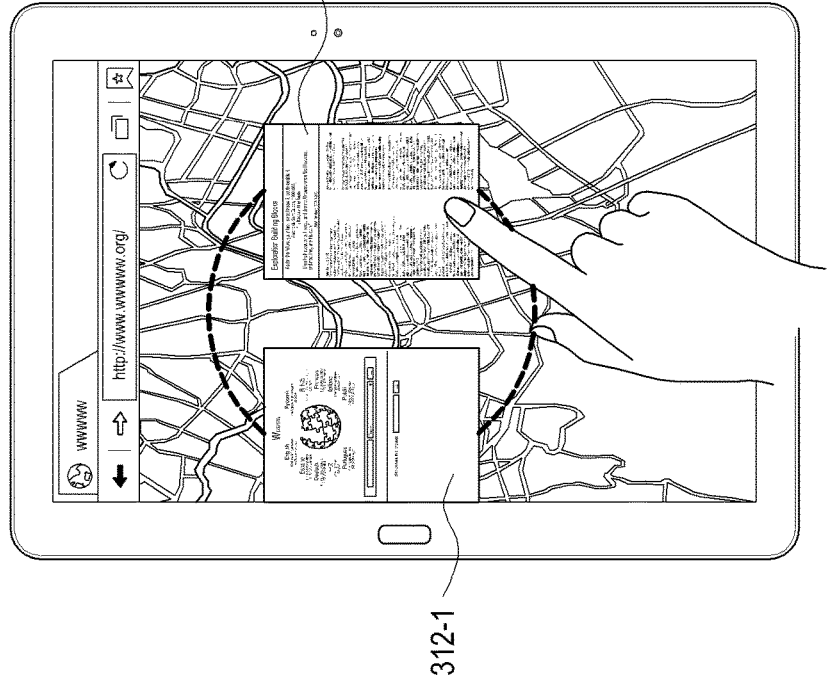

In operation 390 of FIG. 3E, the sensing unit 180 may sense a tap input or a double tap input on the identification information 313-1 of the third webpage.

As in operation 395 of FIG. 3E, in response to a user input, the processor 190 may be configured to control the display 130 to display the third webpage 313 on the web browser screen, enlarged to occupy the web browser screen.

As such, as in an example embodiment, the user may display a bookmarked webpage quickly and simply through a simple user interface. According to the prior art, the user needed to select the backward icon or forward icon several times to display and search his desired webpage. However, an example embodiment may get rid of such user inconvenience.

FIGS. 4A to 4E are views illustrating a process of displaying a webpage.

Figure 4A:
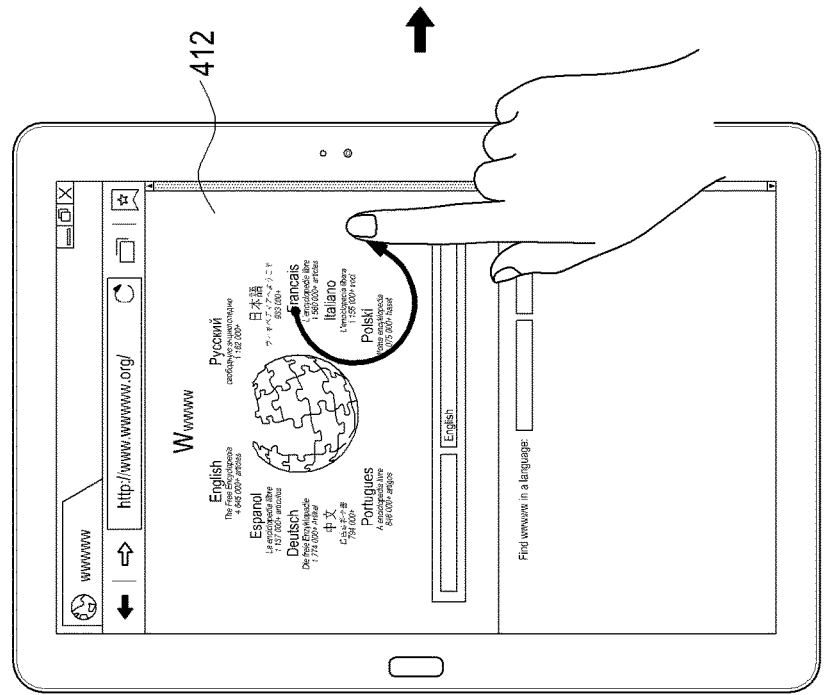
FIGS. 4A to 4E are views illustrating a process of displaying a webpage.
Figure 4A:
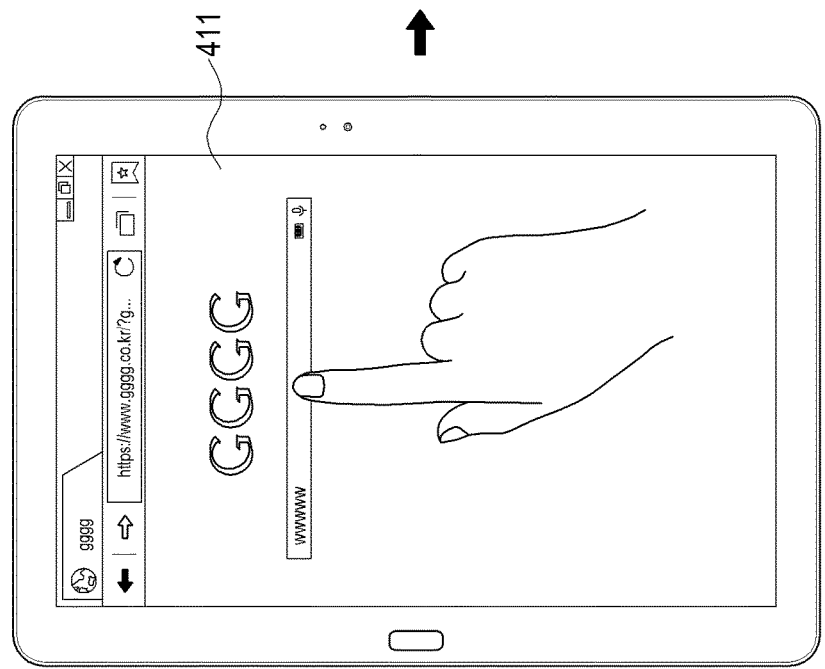

Referring to FIG. 4A, the processor 190 may be configured to control the display 130 to run a web browser so that a first webpage 411 is displayed on the web browser screen as illustrated in operation 410 of FIG. 4A. Next, the sensing unit 180 may sense a user input for displaying a second webpage 412. The user input may, for example, bean input of a keyword related to the second webpage 412 in an input field of the first webpage 411.

Responsive to the user input, the processor 190 may be configured to control the display 130 to display the second webpage 412 on the web browser screen as illustrated in operation 420 of FIG. 4A. Next, the sensing unit 180 may sense a user input for bookmarking the second webpage 412. The user input may be a gesture input previously defined, e.g., a gesture input of drawing a circle.

In response to the user input, the processor 190 may be configured to cause the second webpage 412 to be bookmarked. Next, as in operation 430 of FIG. 4B, while the second webpage 412 continues to be displayed, the sensing unit 180 may sense a user input to display a third webpage 413. The user input may be, e.g., an input of a keyword related to the third webpage 413.

Figure 4B:
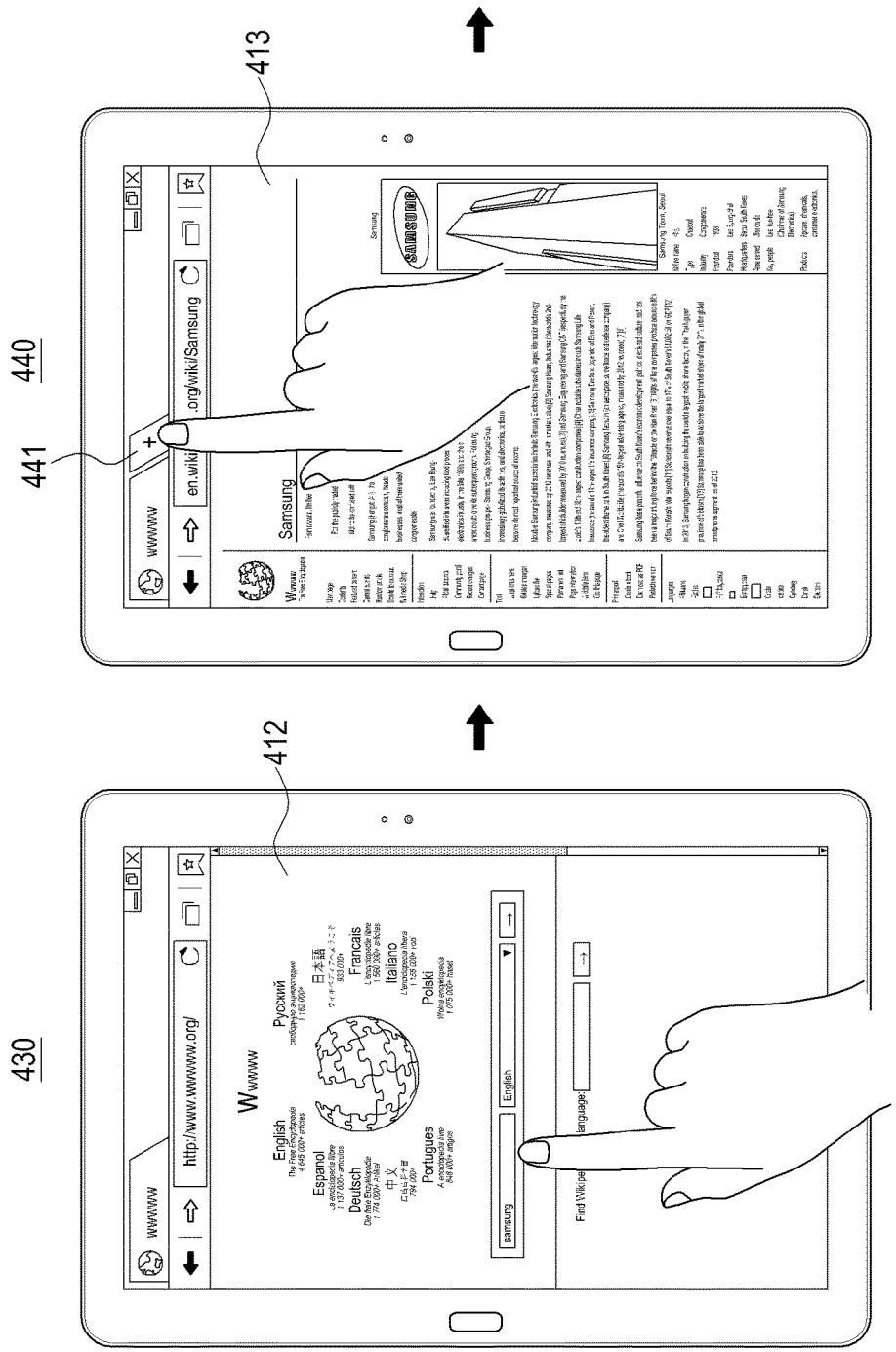

Responsive to the user input, the processor 190 may be configured to control the display 130 to display the third webpage 413 on the web browser screen as illustrated in operation 440 of FIG. 4B. Next, the sensing unit 180 may sense a user input to run a new web browser screen. The user input may be, e.g., a tap input of selecting a new tab 441 on the menu of the browser screen.

Figure 4C:
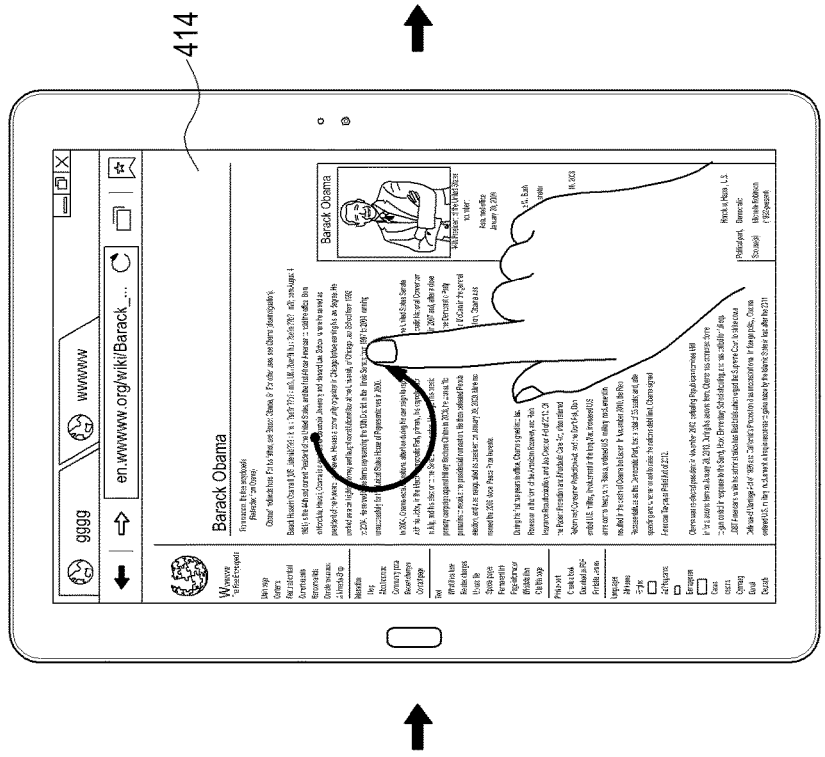
Figure 4C:
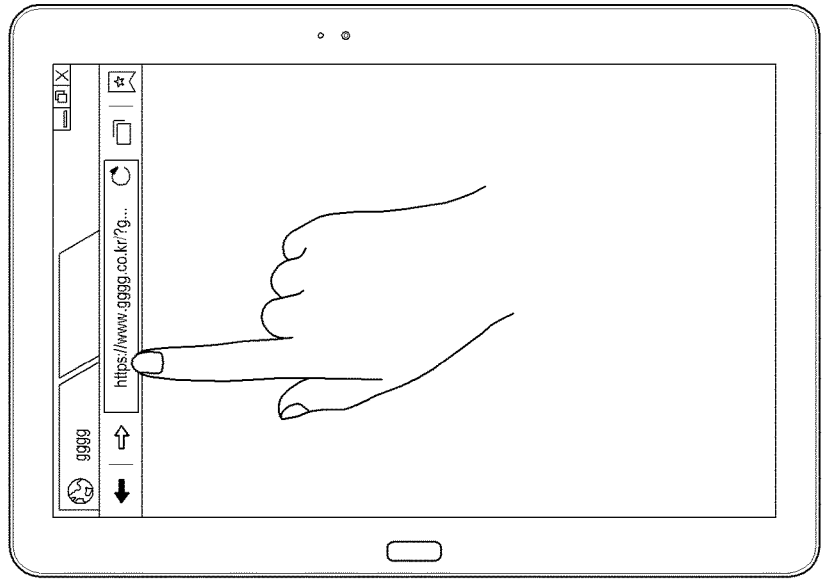

As in operation 450 of FIG. 4C, the processor 190 may be configured to control the display 130 to display a new web browser screen in response to the user input. Next, the sensing unit 180 may sense a user input for displaying a fourth webpage 414. The user input may, for example, be an input of a keyword (e.g., a link address) related to the fourth webpage 414 in an address bar of the new web browser screen.

Responsive to the user input, the processor 190 may be configured to control the display 130 to display the fourth webpage 414 on the web browser screen as in operation 460 of FIG. 4C. Next, the sensing unit 180 may sense a user input for bookmarking the fourth webpage 414. The user input may be a gesture input previously defined, e.g., a gesture input of drawing a circle.

In response to the user input, the processor 190 may be configured to cause the fourth webpage 414 to be bookmarked. Next, as in operation 470 of FIG. 4D, while the fourth webpage 414 continues to be displayed, the sensing unit 180 may sense a user input to display a fifth webpage 415. The user input may be, e.g., a user input of selecting a link object included in the fifth webpage 415.

Figure 4D:
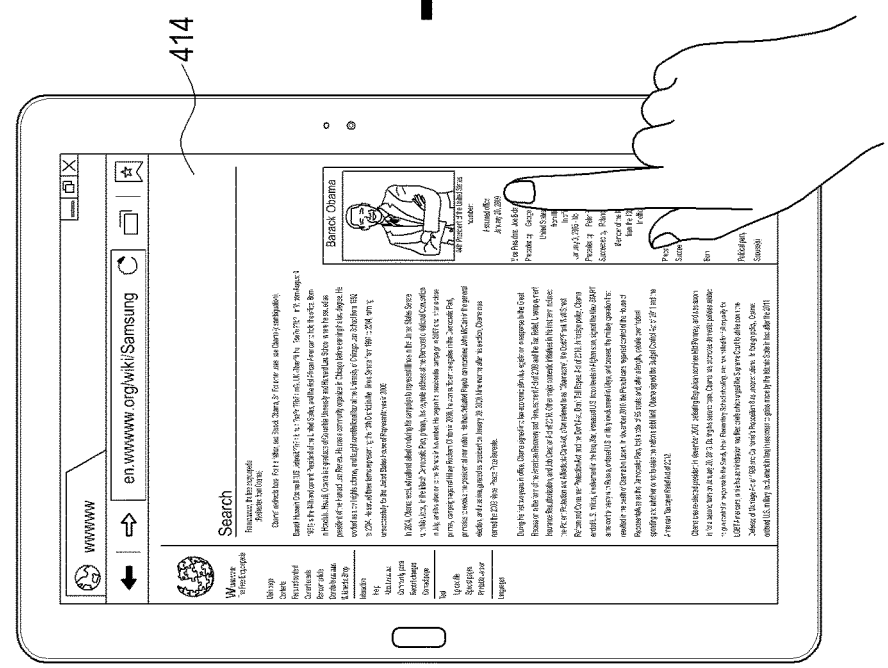
Figure 4D:
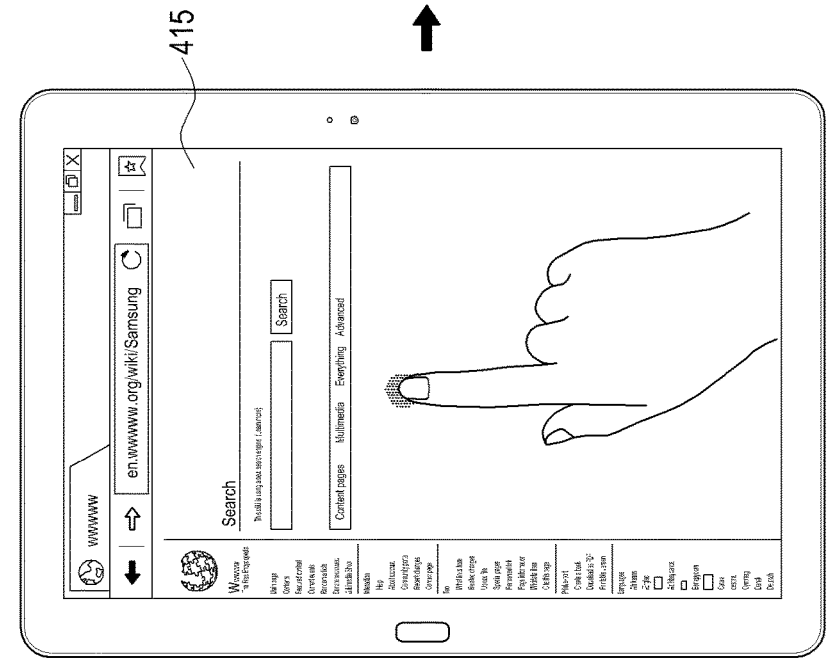

Responsive to the user input, the processor 190 may be configured to control the display 130 to display the fifth webpage 415 on the web browser screen as in operation 480 of FIG. 4D. Next, the sensing unit 180 may sense a user input to display identification information of at least one of the bookmarked webpages. For example, the user input may be a gesture input previously defined, e.g., a touch-and-hold input of maintaining a touch on the fifth webpage 415 for a predetermined time.

Figure 4E:
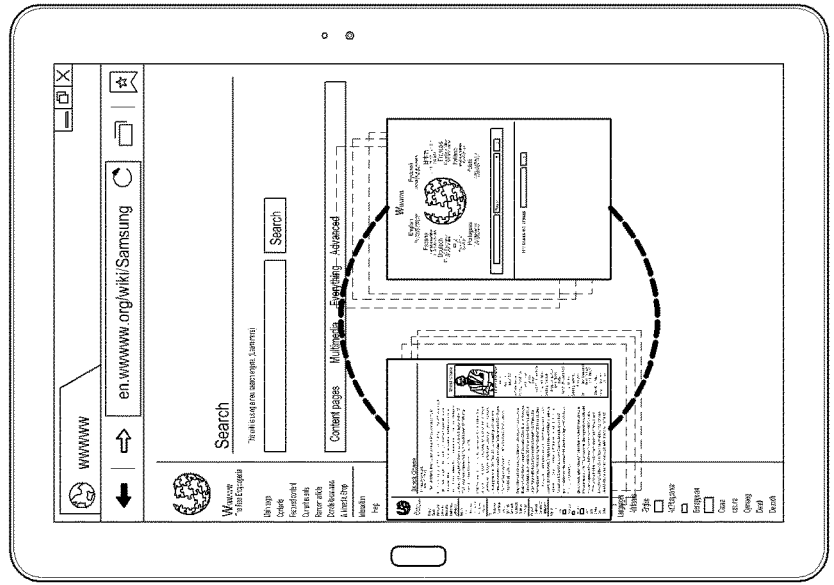
Figure 4E:
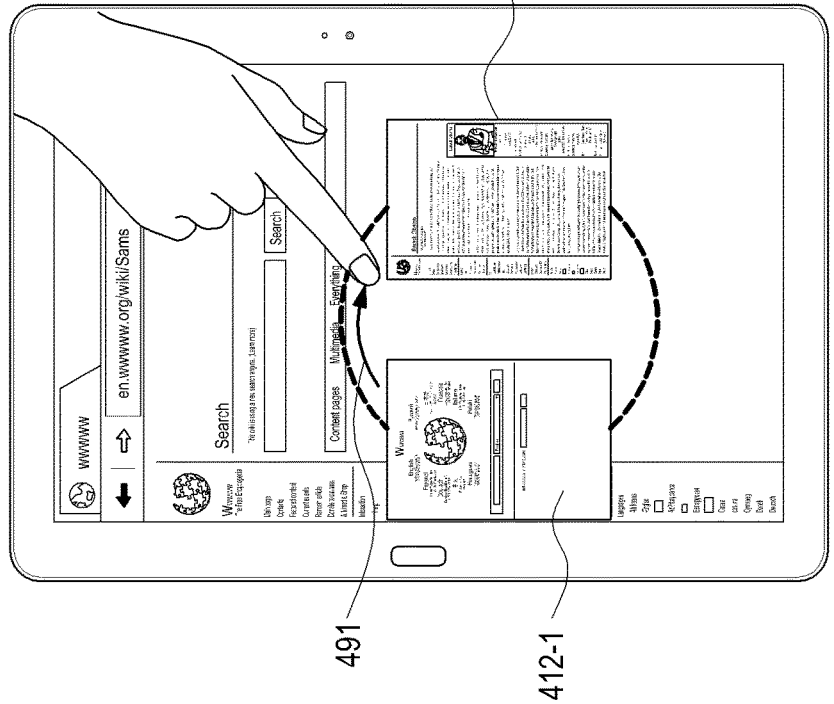

In response to the user input, as in operation 490 of FIG. 4E, the processor 190 may be configured to control the display 130 to display at least one of the identification information 412-1 of the bookmarked second webpage and identification information 414-1 of the bookmarked fourth webpage. In this case, the identification information 412-1 of the second webpage may be at least one of the second webpage whose display area has been shrunken, a thumbnail of the second webpage, a title of the second webpage, a favicon representing a logo of the second webpage, or part of the second webpage, etc. Further, the identification information of the fourth webpage may be at least one of the fourth webpage whose display area has been shrunken, a thumbnail of the fourth webpage, a title of the fourth webpage, a favicon representing a logo of the fourth webpage, or part of the fourth webpage, etc.

For example, the identification information of the bookmarked webpages may be displayed considering the times bookmarked. For example, identification information on a latest bookmarked webpage may be displayed to be positioned closer to the center of the web browser screen.

Next, the sensing unit 180 may sense a user input to move the identification information 412-1 of the second webpage and the identification information 414-1 of the fourth webpage. As an example, the user input may be a gesture information of drawing an arc 491 between the identification information 412-1 of the second webpage and the identification information of the fourth webpage 414-1.

In response to the user input, as in operation 495 of FIG. 4E, the processor 190 may be configured to control the display 130 to display the identification information 412-1 of the second webpage and identification information 414-1 of the fourth webpage, with the identification information relocated. For example, corresponding to the amount of the drag based on the user's gesture input, the identification information 412-1 of the second webpage and the identification information 414-1 of the fourth webpage may be gradually moved, leaving after images.

FIGS. 5A to 5E are views illustrating a process of displaying a webpage.

Figure 5A:
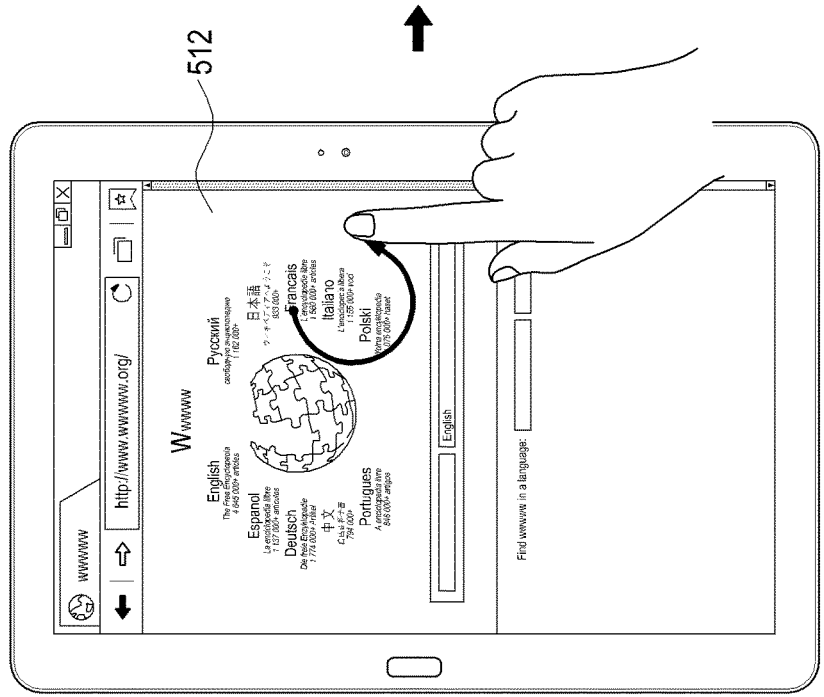
FIGS. 5A to 5E are views illustrating a process of displaying a webpage.
Figure 5A:
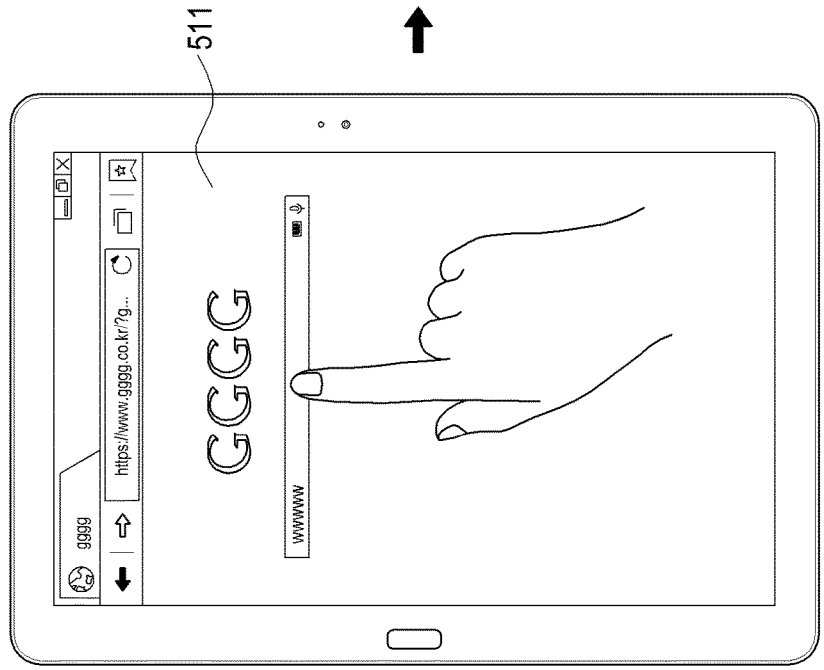

Referring to FIG. 5A, the processor 190 may be configured to control the display 130 to run a web browser so that a first webpage 511 is displayed on the web browser screen as illustrated in operation 510 of FIG. 5A. Next, the sensing unit 180 may sense a user input for displaying a second webpage 512.

Responsive to the user input, the processor 190 may be configured to control the display 130 to display the second webpage 512 on the web browser screen as illustrated in operation 520 of FIG. 5A. Next, the sensing unit 180 may sense a user input for bookmarking the second webpage 512. The user input may be a gesture input previously defined, e.g., a gesture input of drawing a circle.

In response to the user input, the processor 190 may be configured to cause the second webpage 512 to be bookmarked. Next, as in operation 530 of FIG. 5B, while the second webpage 512 continues to be displayed, the sensing unit 180 may sense a user input to display a third webpage 513.

Figure 5B:
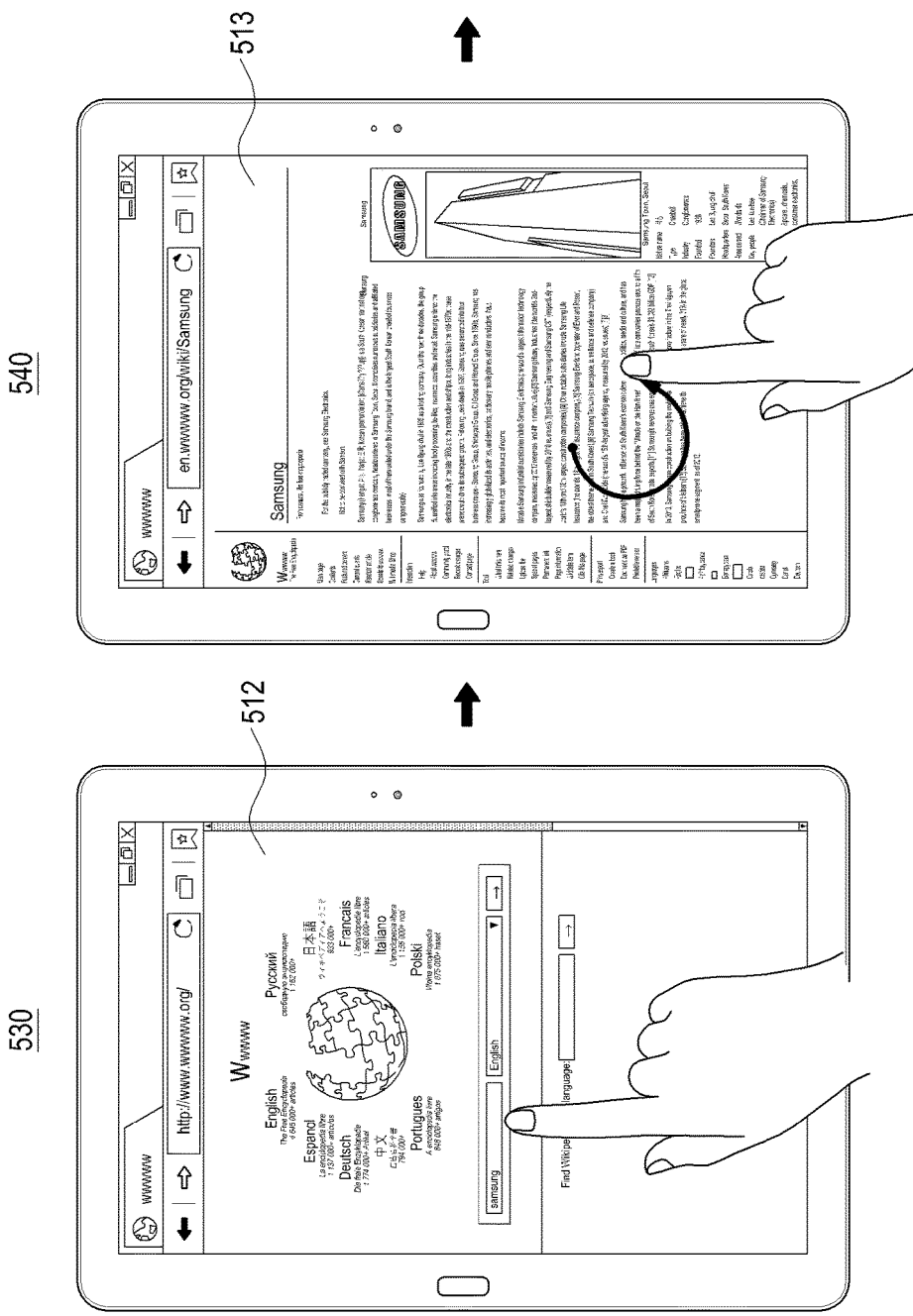

Responsive to the user input, the processor 190 may be configured to control the display 130 to display the third webpage 513 on the web browser screen as illustrated in operation 540 of FIG. 5B. Next, the sensing unit 180 may sense a user input for bookmarking the third webpage 513. The user input may be a gesture input previously defined, e.g., a gesture input of drawing a circle.

Figure 5C:
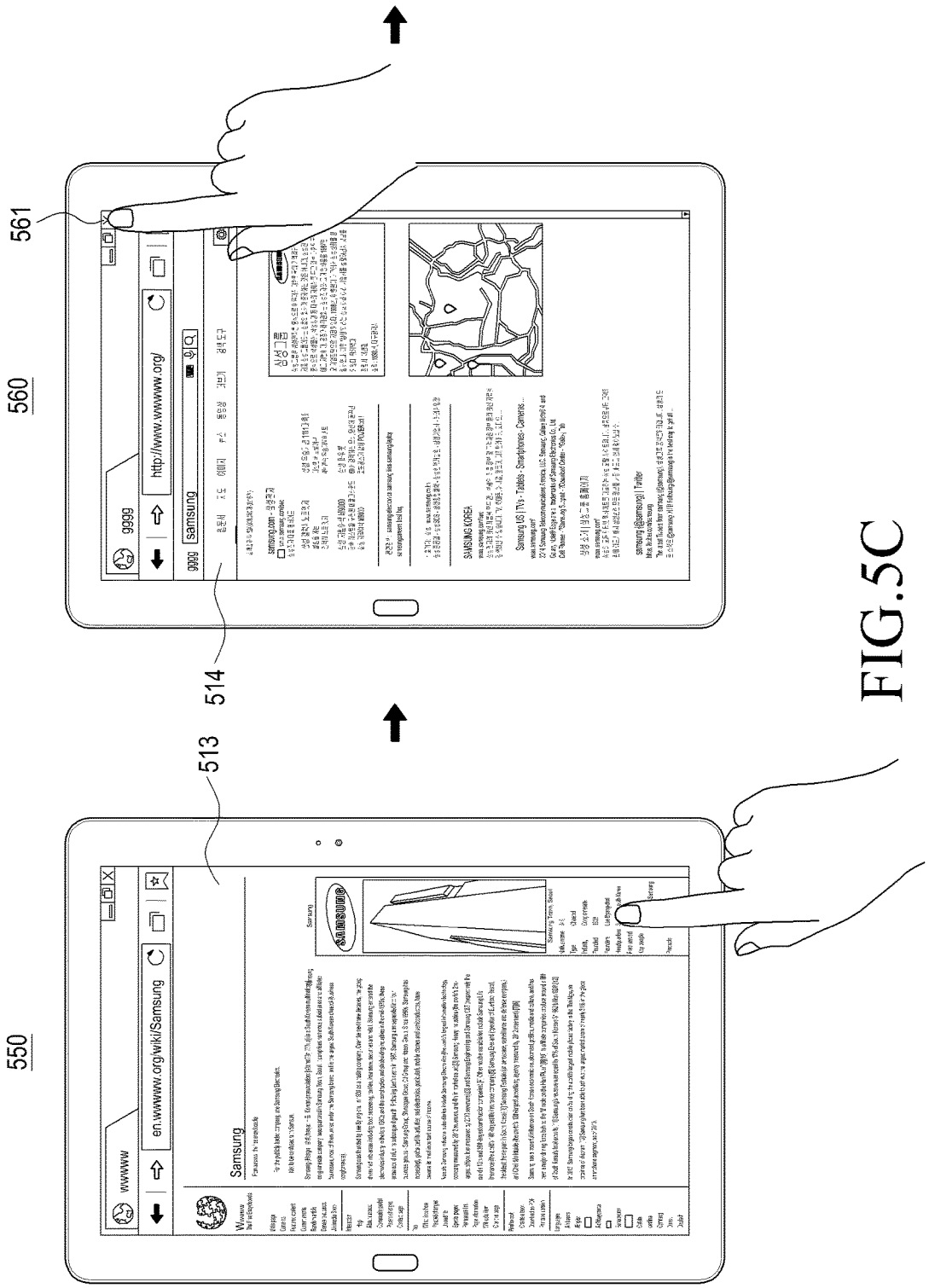

Next, as in operation 550 of FIG. 5C, while the third webpage 513 continues to be displayed, the sensing unit 180 may sense a user input to display a fourth webpage 514. The user input may be, e.g., a user input of selecting a link object included in the third webpage 513.

Responsive to the user input, the processor 190 may be configured to control the display 130 to display the fourth webpage 514 on the web browser screen as illustrated in operation 560 of FIG. 5C. Next, the sensing unit 180 may sense a user input to end the running web browser application. The user input may be, e.g., a tap input of selecting an end button 561 of the web browser screen.

In response to the user input, the processor 190 may be configured to end the web browser screen. For example, the processor 190 may be configured to store the bookmarked information on the webpage in a bookmark database. The bookmarked information may be, e.g., at least one of a domain name, a link address, a thumbnail, a title, and a favicon representing a logo of the webpage. For example, the bookmark database may be stored in the memory 150 or a cloud including at least one server. For example, the processor 190 may be configured to control the communication unit 140 to transmit the bookmarked information to the cloud.

Figure 5D:
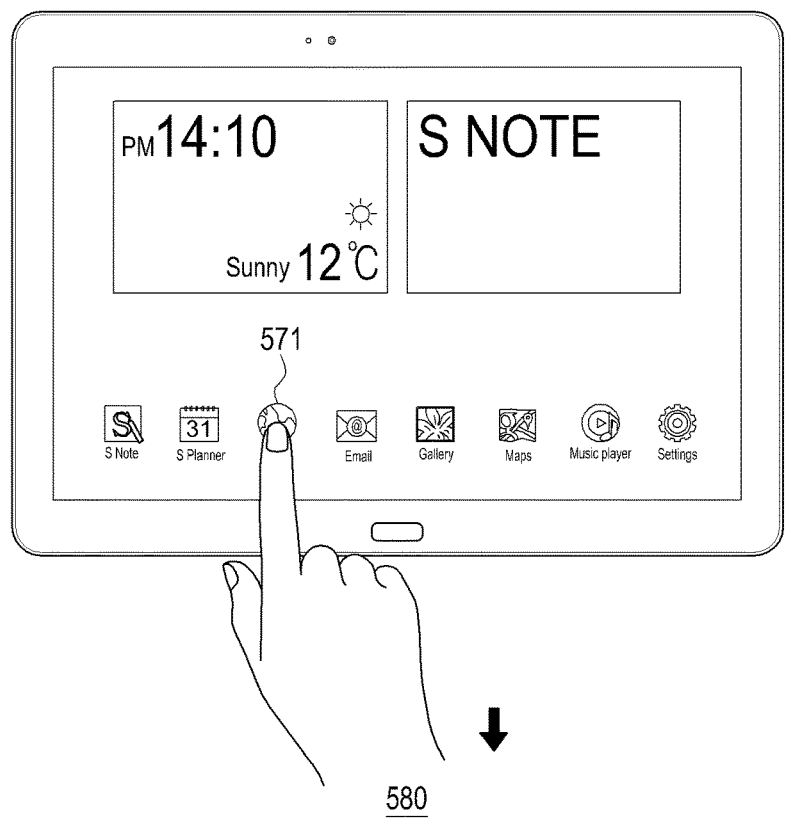
Figure 5D:
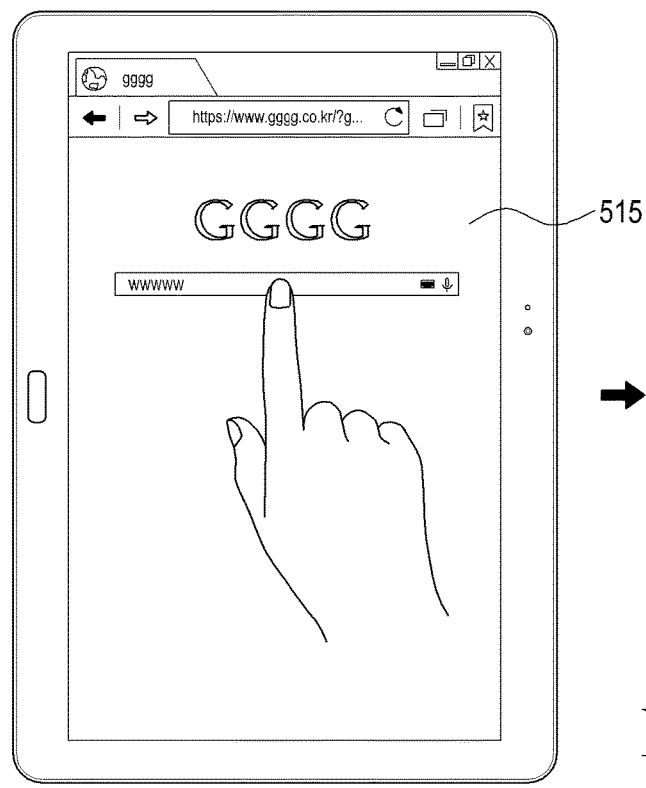

Next, as in operation 570 of FIG. 5D, the processor 190 may be configured to control the display 130 to display application identification information including identification information (e.g., an icon) on the web browser application. Subsequently, the sensing unit 180 may sense a tap input of selecting the identification information 571 of the web browser application.

In response to the user input, the processor 190 may be configured to rerun the web browser application. As in operation 580 of FIG. 5D, the processor 190 may be configured to control the display 130 to display a fifth webpage 515 on the web browser screen as a result of running the web browser application. Next, the sensing unit 180 may sense a user input for displaying a sixth webpage 516 as illustrated in operation 590 of FIG. 5E.

Figure 5E:
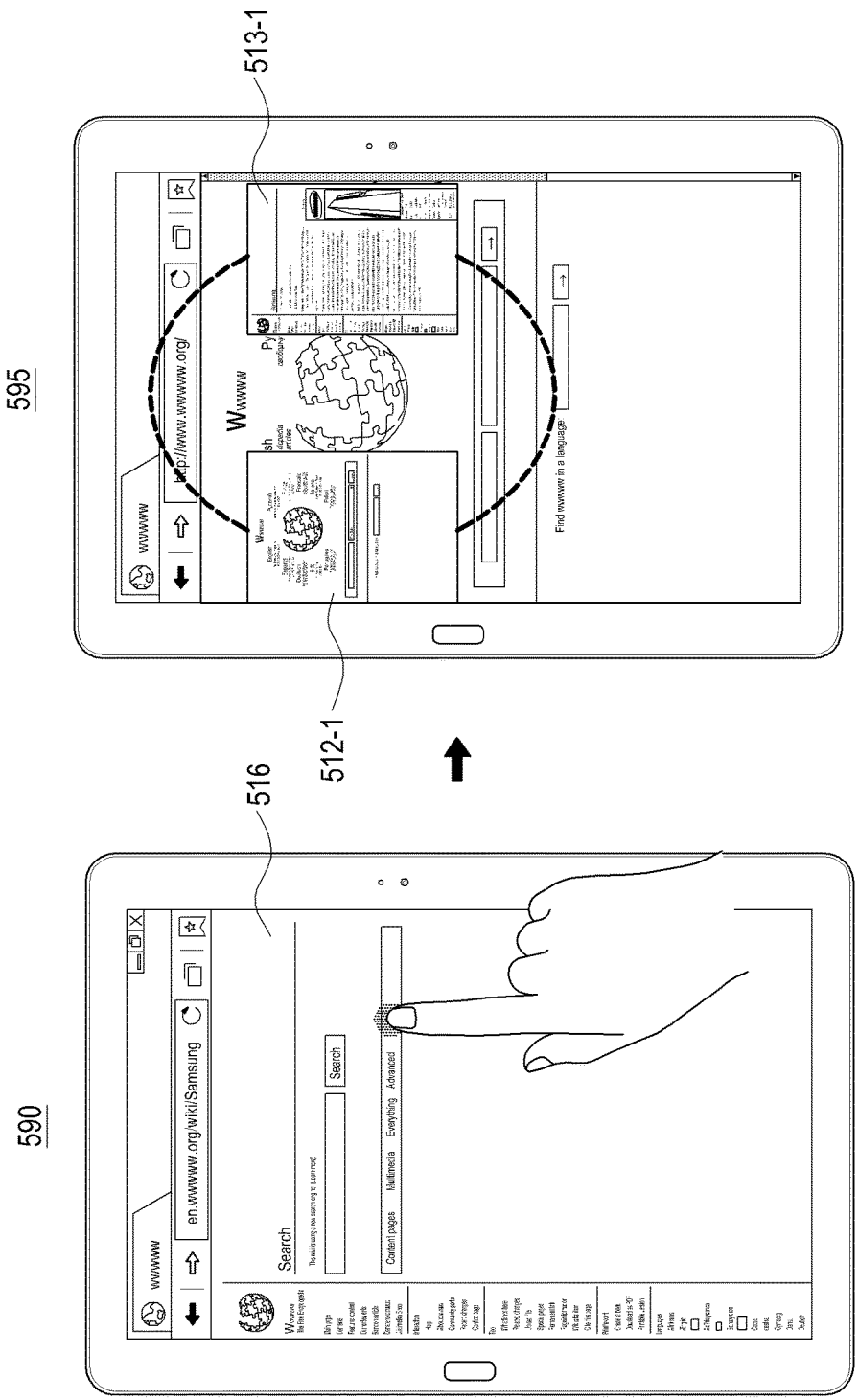

Responsive to the user input, the processor 190 may be configured to control the display 130 to display the sixth webpage 516 on the web browser screen as illustrated in operation 590 of FIG. 5E. Next, the sensing unit 180 may sense a user input to display identification information on at least one of the bookmarked webpages, with the sixth webpage 516 displayed. For example, the user input may be a gesture input previously defined, e.g., a touch-and-hold input of maintaining a touch on the fifth webpage 516 for a predetermined time.

In response to the user input, the processor 190 may be configured to extract the identification information 512-1 of the bookmarked second webpage and identification information 513-1 of the bookmarked third webpage in the bookmark database. As illustrated in operation 595 of FIG. 5E, the processor 190 may be configured to control the display 130 to display the identification information 512-1 of the bookmarked second webpage and the identification information 513-1 of the third webpage on the web browser screen.

Figure 6A:
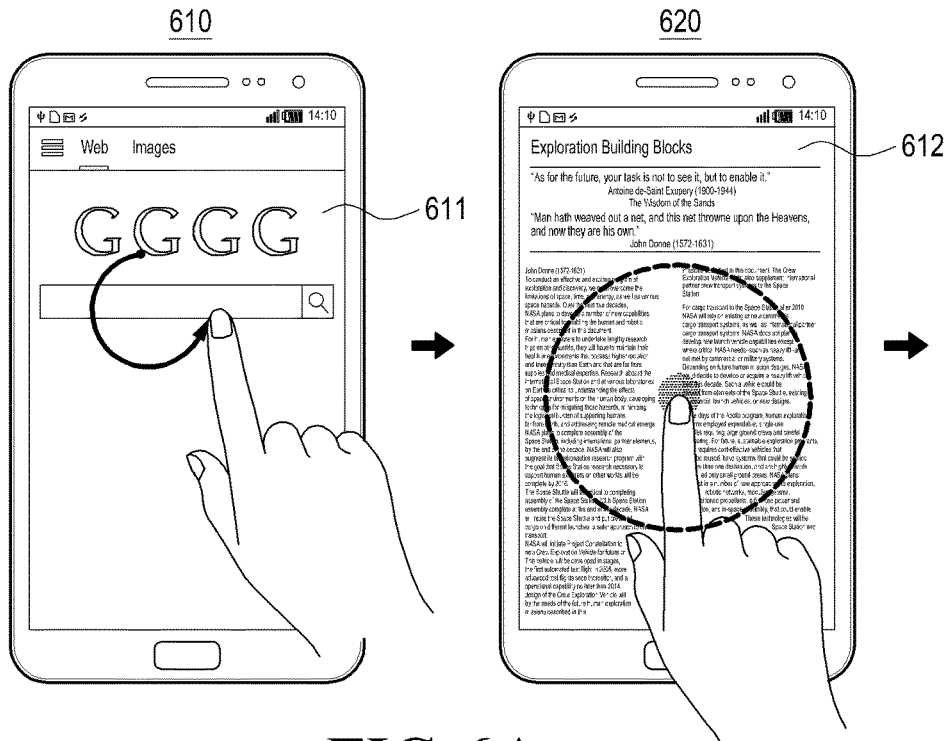
FIGS. 6A and 6B are views illustrating a process of sharing an electronic document bookmarked between different applications.
Figure 6B:
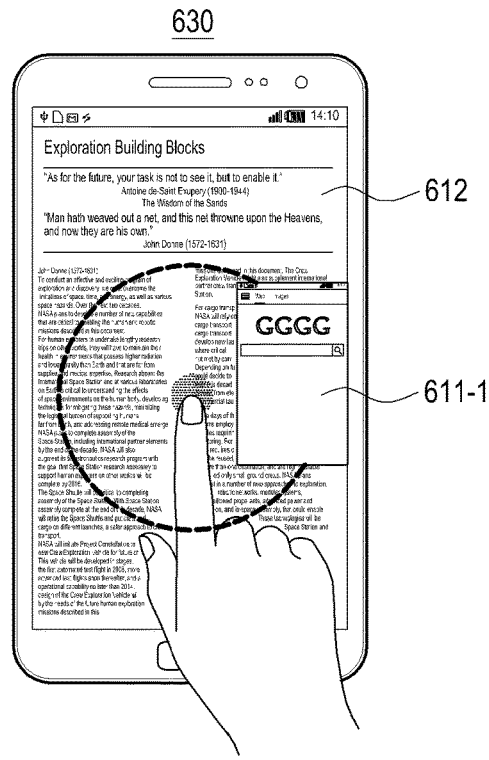

FIGS. 6A and 6B are views illustrating a process of sharing an electronic document bookmarked between different applications.

Referring to FIG. 6A, as illustrated in operation 610 of FIG. 6A, the processor 190 may run a first viewer application (e.g., a web browser application) and may be configured to control the display 130 to display a first electronic document (e.g., a webpage) 611 on the web browser screen. Next, the sensing unit 180 may sense a user input for bookmarking the first electronic document 611. The user input may be a gesture input previously defined, e.g., a gesture input of drawing a circle on the first electronic document 611.

In response to the user input, the processor 190 may be configured to cause the first electronic document 611 to be bookmarked. Next, the sensing unit 180 may sense a user input to display a second electronic document (e.g., a PDF document) 612.

As in operation 620 of FIG. 6A, the processor 190 may run a second viewer application (e.g., a PDF viewer application) and may be configured control the display 130 to display the second electronic document 612 in response to a user input. Next, the sensing unit 180 may sense a user input to display identification information of at least one of the bookmarked electronic documents. The user input may be a touch input previously defined, e.g., a touch-and-hold input that maintains a touch for a predetermined time. The user input may be a gesture input previously defined, e.g., a gesture input of drawing a check ('√') or "V" on the second electronic document 612. The user input may be a voice input previously defined, e.g., a voice speaking out "bring up a bookmark." When a popup screen including a list of the bookmarked electronic documents is displayed, the user input may be a user input of selecting at least one of the list of the bookmarked electronic documents. Even without the user input, when the second electronic document 612 is displayed, identification information of at least one of the bookmarked electronic documents may be automatically displayed.

As in operation 630 of FIG. 6B, in response to a user input, the processor 190 may be configured to control the display 130 to display the identification information 611-1 of the bookmarked first electronic document on the second electronic document 612.

Figure 7A:
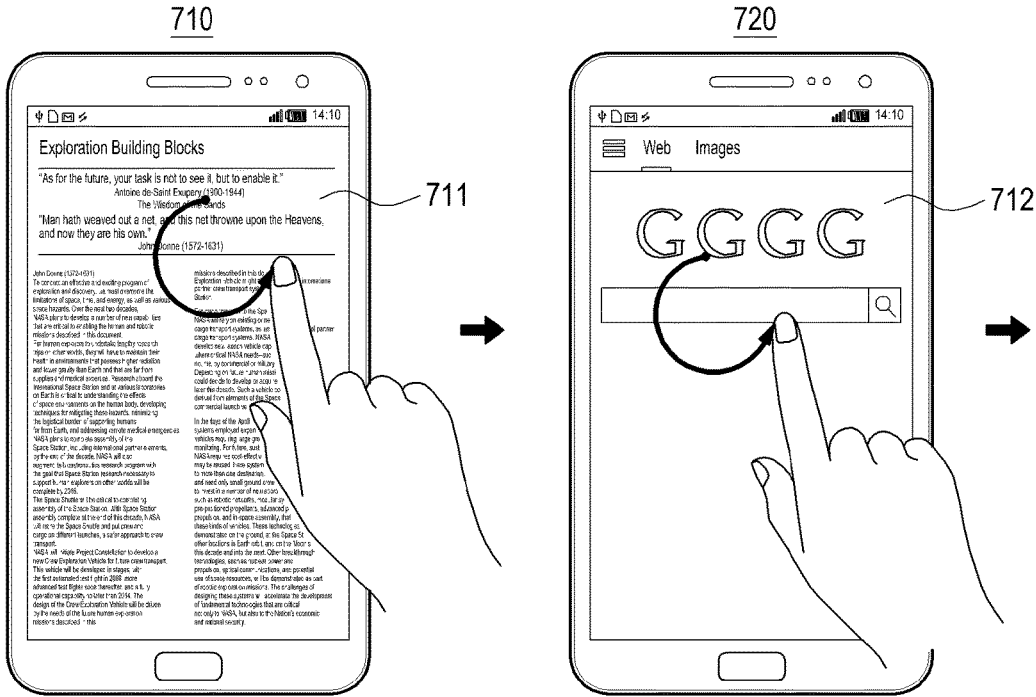
FIGS. 7A to 7C are views illustrating a process of sharing an electronic document bookmarked between different applications.
Figure 7B:
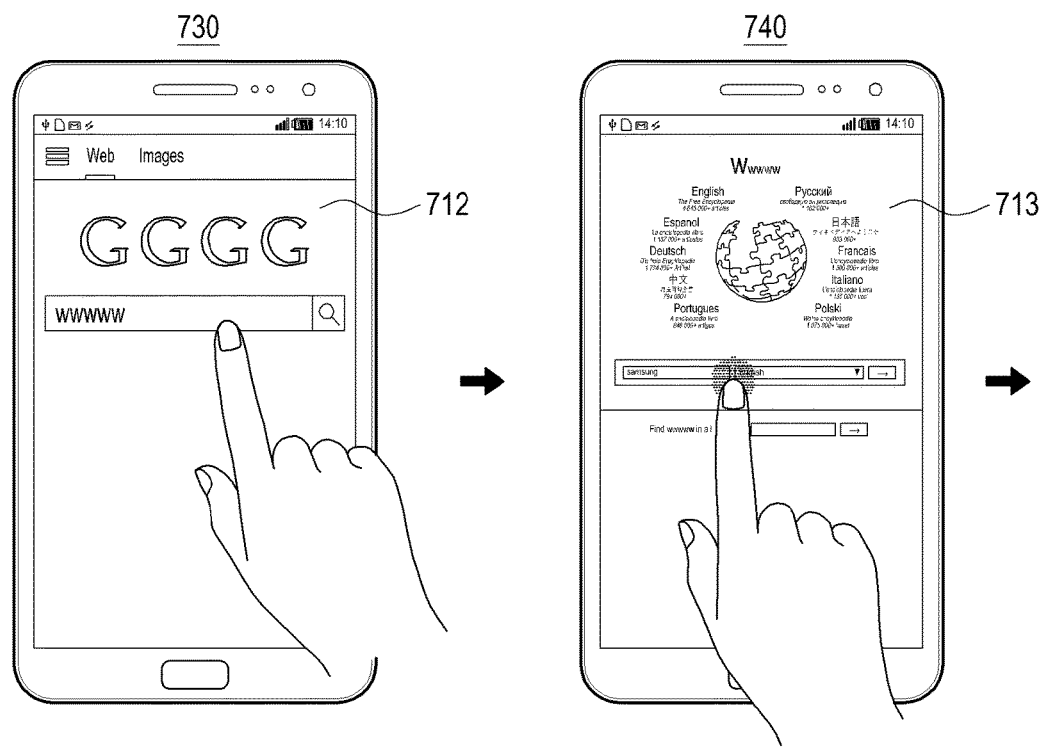
Figure 7C:
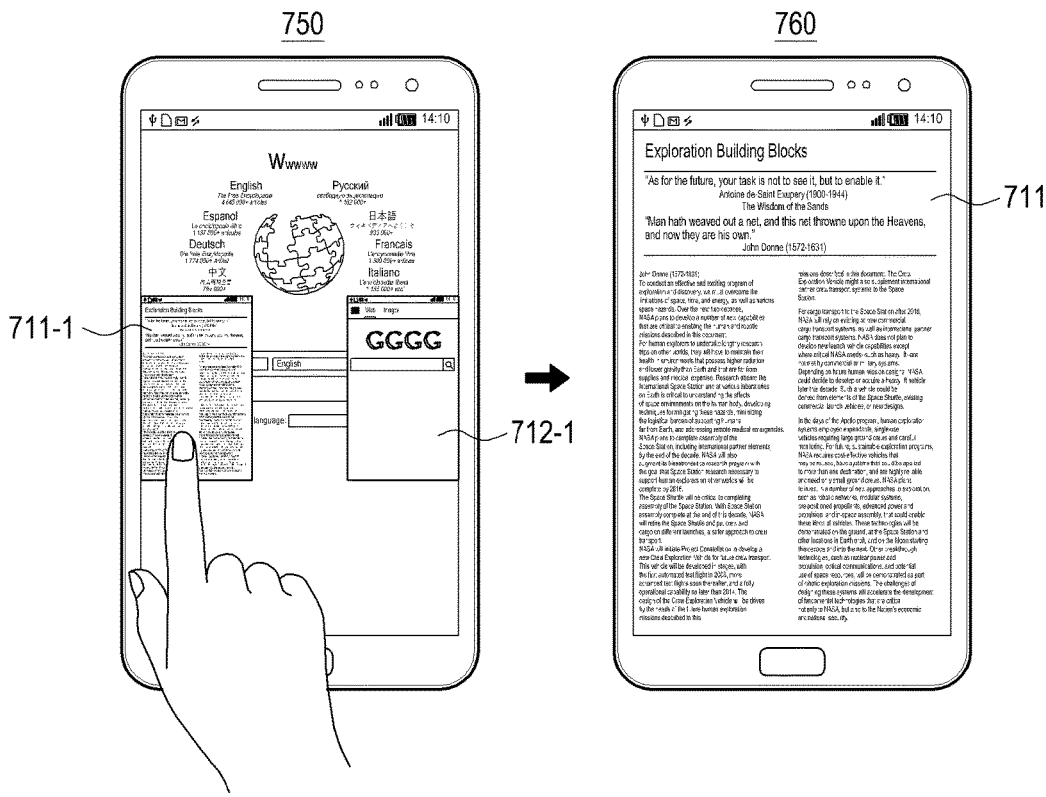

FIGS. 7A to 7C are views illustrating a process of sharing an electronic document bookmarked between different applications.

Referring to FIG. 7A, as in operation 710 of FIG. 7A, the processor 190 may run a first viewer application (e.g., a PDF viewer application) and may be configured to control the display 130 to display a first electronic document (e.g., a PDF document) 711. Next, the sensing unit 180 may sense a user input for bookmarking the first electronic document 711. The user input may be a gesture input previously defined, e.g., a gesture input of drawing a circle on the first electronic document 711.

In response to the user input, the processor 190 may be configured to cause the first electronic document 711 to be bookmarked. Next, the sensing unit 180 may sense a user input for displaying a second electronic document (e.g., a webpage) 712.

As in operation 720 of FIG. 7A, the processor 190 may run a second viewer application (e.g., a web browser application) and may be configured to control the display 130 to display the second electronic document (e.g., a webpage) 712 in response to a user input. Next, the sensing unit 180 may sense a user input for bookmarking the second electronic document (e.g., a webpage) 712. The user input may be a gesture input previously defined, e.g., a gesture input of drawing a circle on the second electronic document 712.

In response to the user input, the processor 190 may be configured to cause the second electronic document 712 to be bookmarked.

Next, as in operation 730 of FIG. 7B, while the second electronic device, e.g., a webpage, 712 continues to be displayed, the sensing unit 180 may sense a user input to display a third electronic device (e.g., a webpage) 713. The user input may be, e.g., an input of a keyword related to the third electronic device 713 in an input field of the second webpage 712.

Responsive to the user input, the processor 190 may be configured to control the display 130 to display the third electronic device 713 as in operation 740 of FIG. 7B. Next, the sensing unit 180 may sense a user input to display identification information on at least one of the bookmarked electronic documents. The user input may be a touch input, e.g., a touch-and-hold input that maintains a touch on the third electronic device 713 for a predetermined time. The user input may be a gesture input of drawing a check ('√') or "V" on the third electronic document 713. The user input may be a voice input previously defined, e.g., a voice speaking out "bring up a bookmark." When a popup screen including a list of the bookmarked electronic documents is displayed, the user input may be a user input of selecting at least one of the list of the bookmarked electronic documents. Even without the user input, when the third electronic document 713 is displayed, identification information on at least one of the bookmarked electronic documents may be automatically displayed.

As in operation 750 of FIG. 7C, in response to a user input, the processor 190 may be configured to control the display 130 to display the identification information 711-1 of the bookmarked first electronic document and the identification information 712-1 of the second electronic document. Next, the sensing unit 180 may sense a user input of selecting the identification information 712-1 of the second electronic document.

In response to the user input, the processor 190 may run a view application related to the second electronic document 712, or when the viewer application is already running, turn the viewer application into a foreground mode. The processor 190 may be configured to control the display 130 to display the first electronic document 711 as in operation 760 of FIG. 7C. In this case, the processor 190 may be configured to control the display 130 to display the first electronic document 711, with the first electronic document 711 enlarged to fill the viewer screen.

Figure 8A:
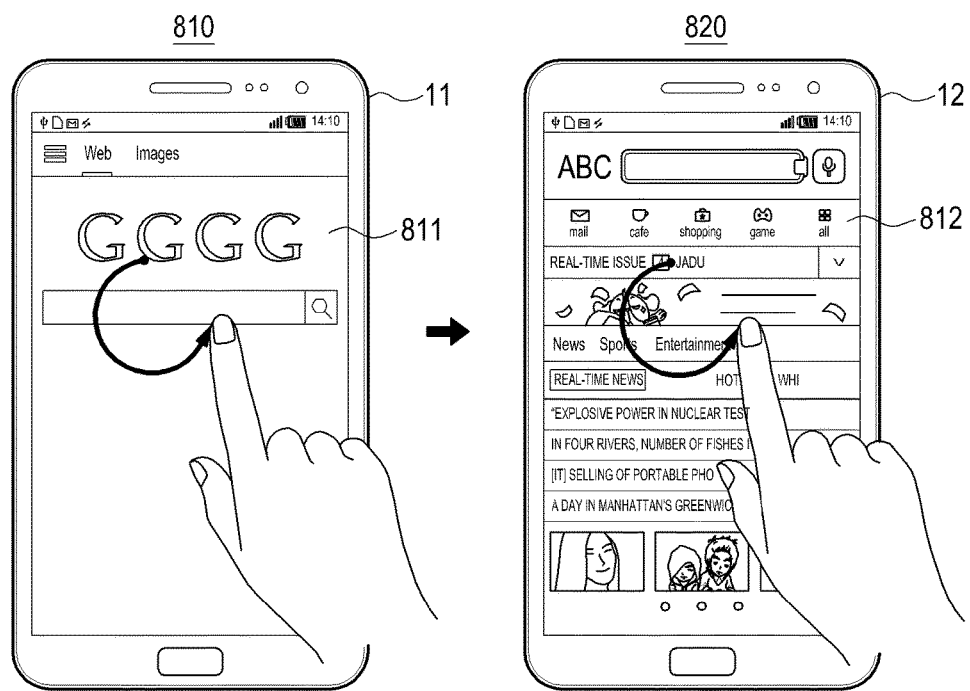
FIGS. 8A to 8C are views illustrating a process of sharing an electronic document bookmarked between different electronic devices.
Figure 8B:
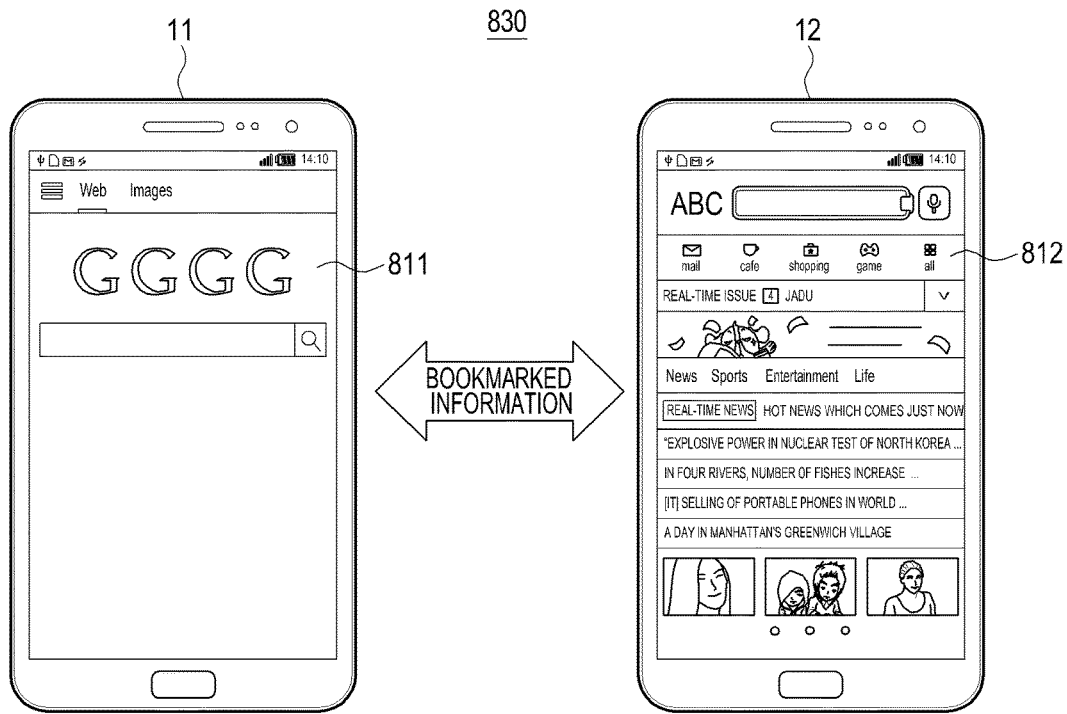
Figure 8C:
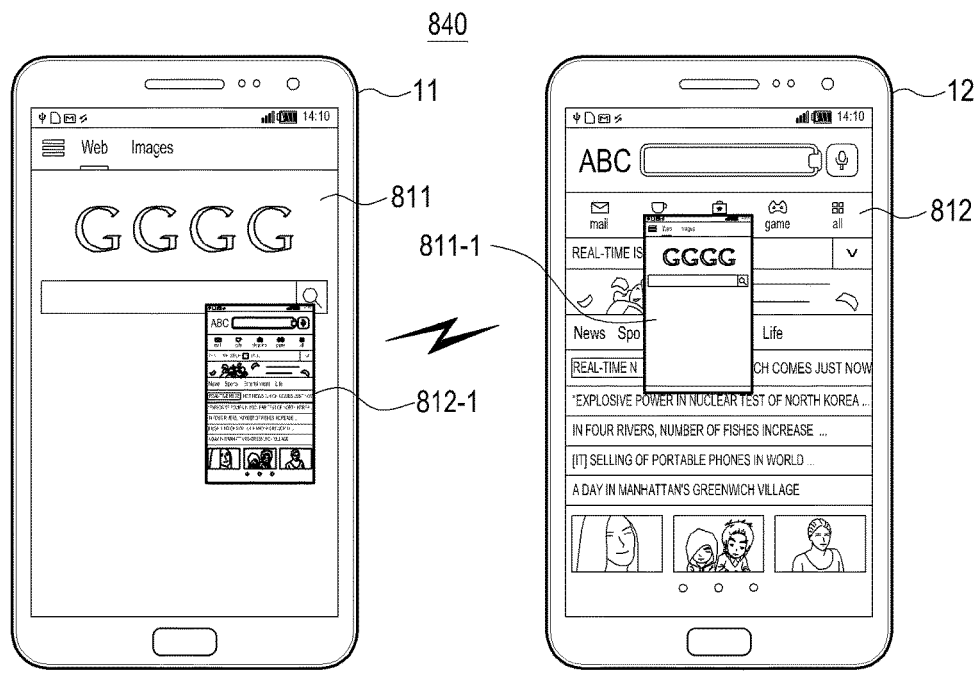

FIGS. 8A to 8C are views illustrating a process of sharing an electronic document bookmarked between different electronic devices.

According to an example embodiment, a communication session may be formed between the first electronic device 11 and the second electronic device 12. For example, the communication session between the first electronic device 11 and the second electronic device 12 may be formed using, but not limited to, a remote server communication protocol, a multicastomainameystem (mDNND) communication protocol, a simple service discovery protocol (SSDP) communication protocol, a web real-time communication (WebRTC) communication protocol or a Bluetooth communication protocol, for example.

For example, when a Bluetooth protocol is used as a communication scheme between the first electronic device 11 and the second electronic device 12, if the Bluetooth function of the first electronic device 11 turns on, the communication unit 140 may transmit a power beacon signal to the second electronic device 12. In response to the power beacon signal, the second electronic device 12 may transmit an advertisement signal to indicate that the second electronic device 12 may be connected. In response to the advertisement signal, the first electronic device 11 sends a connection request signal to an external device, and accordingly, a communication session may be formed between the first electronic device 11 and the second electronic device 12.

In operation 810 of FIG. 8A, the processor 190 of the first electronic device 11 may run a viewer application (e.g., a web browser application) and may be configured to control the display 130 to display a first electronic document (e.g., a webpage) 811. Next, the sensing unit 180 may sense a user input for bookmarking the first electronic document 811. The user input may be a gesture input previously defined, e.g., a gesture input of drawing a circle. In response to the user input, the processor 190 may be configured to store the bookmarked information of the first electronic document 811.

In operation 820 of FIG. 8A, the processor 190 of the second electronic device 12 may run a viewer application (e.g., a web browser application) and may be configured to control the display 130 to display a second electronic document (e.g., a webpage) 812. Next, the sensing unit 180 may sense a user input for bookmarking the second electronic document 812. The user input may be a gesture input previously defined, e.g., a gesture input of drawing a circle. In response to the user input, the processor 190 may be configured to store the bookmarked information of the second electronic document 812.

When the bookmarked information is stored in the first electronic device 11 and the second electronic device 12, the bookmarked information may be transmitted bilaterally or unilaterally between the first electronic device 11 and the second electronic device 12, with the communication session formed between the first electronic device 11 and the second electronic device 12 as in operation 830 of FIG. 8B. For example, the communication unit 140 of the first electronic device 11 may transmit the bookmarked information on the first electronic document 811 to the communication unit 140 of the second electronic device 12, and the communication unit 140 of the second electronic device 12 may transmit the bookmarked information on the second electronic document 812 to the communication unit 140 of the first electronic device 11. On the other hand, only the communication unit 140 of the first electronic device 11 may transmit the bookmarked information on the first electronic document 811 to the communication unit 140 of the second electronic device 12. For example, the bookmarked information transmitted bilaterally or unilaterally may be, e.g., at least one of a domain name of the electronic document, a link address, a thumbnail, a title of the electronic document, or a favicon representing a logo of the electronic document.

Regarding the time of the bilateral or unilateral transmission of the bookmarked information, when an event of storing the bookmark in the first electronic device 11 or the second electronic device 12 occurs, the bookmarked information may, for example, be automatically transmitted or the bookmarked information may be automatically transmitted at each predetermined period (e.g., about 30 seconds or one minute).

Next, as the bookmarked information is transmitted between the first electronic device 11 and the second electronic device 12, as in operation 840 of FIG. 8C, the processor 190 of the first electronic device 11 may be configured to control the display 130 to display the identification information 812-1 on the second electronic document bookmarked in the second electronic device 12. Further, the processor 190 of the second electronic device 12 may be configured to control the display 130 to display the identification information 811-1 on the first electronic document bookmarked in the first electronic device 11.

For example, when the bookmarked information is transmitted from the second electronic device 12, the first electronic device 11 may be configured to control the display 130 to display the identification information 812-1 of the second electronic document bookmarked in the second electronic device 12 automatically even without a user input. On the other hand, the first electronic device 11 may be configured to control the display 130 to display the identification information 812-1 of the second electronic document bookmarked in the second electronic device 12 in response to a user input, with the bookmarked information transmitted from the second electronic device 12. For example, the user input may be a user input for displaying the identification information on the electronic document.

For example, the user input may be a gesture input of drawing a check ('√') or "V". Or, the user input may be a touch input, e.g., a touch-and-hold input that maintains a touch for a predetermined time. The user input may be a voice input previously defined, e.g., a voice speaking out "bring up a bookmark."

Figure 9A:
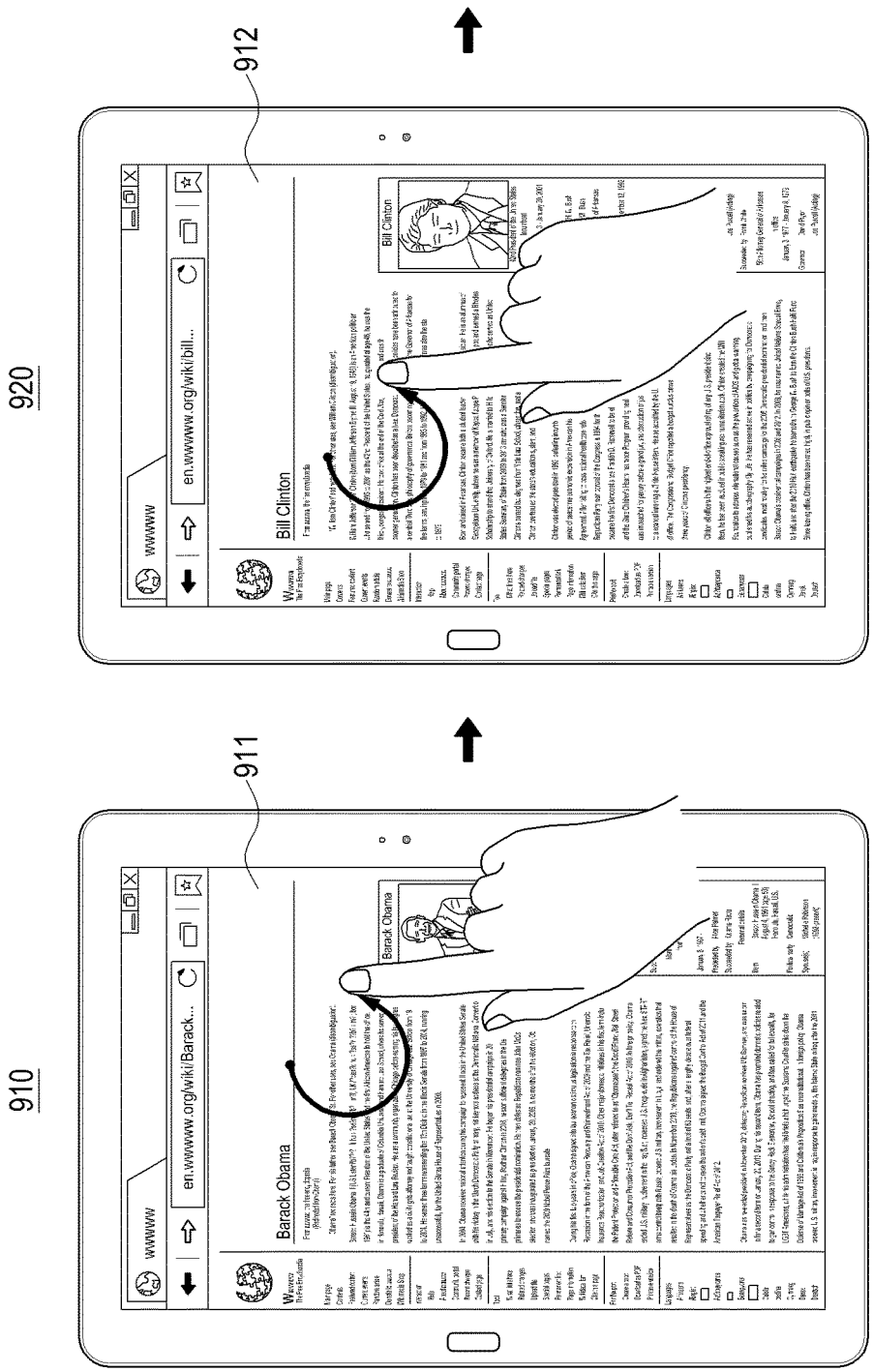
FIGS. 9A and 9B are views illustrating a process of sharing bookmarked information between webpages.
Figure 9B:
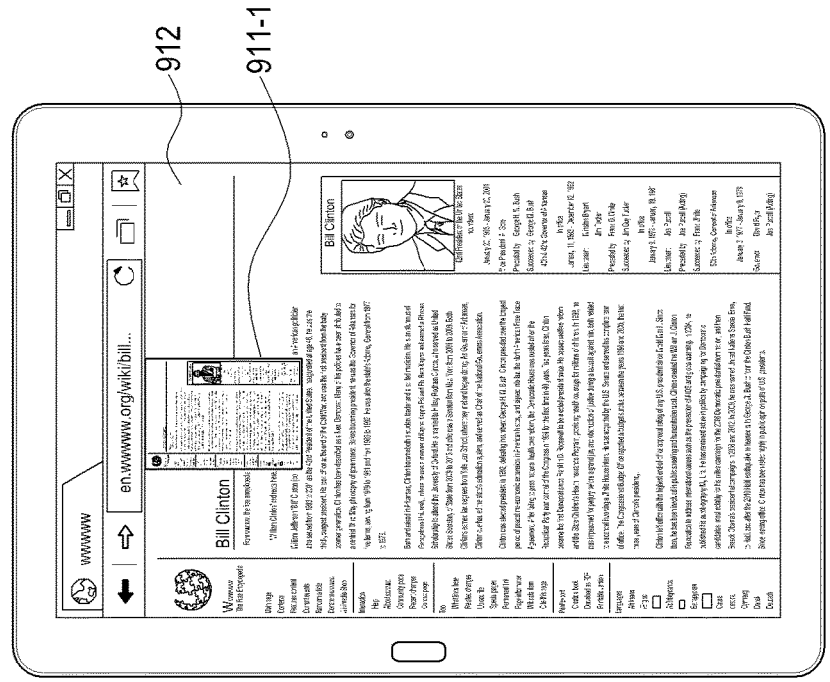
Figure 9B:
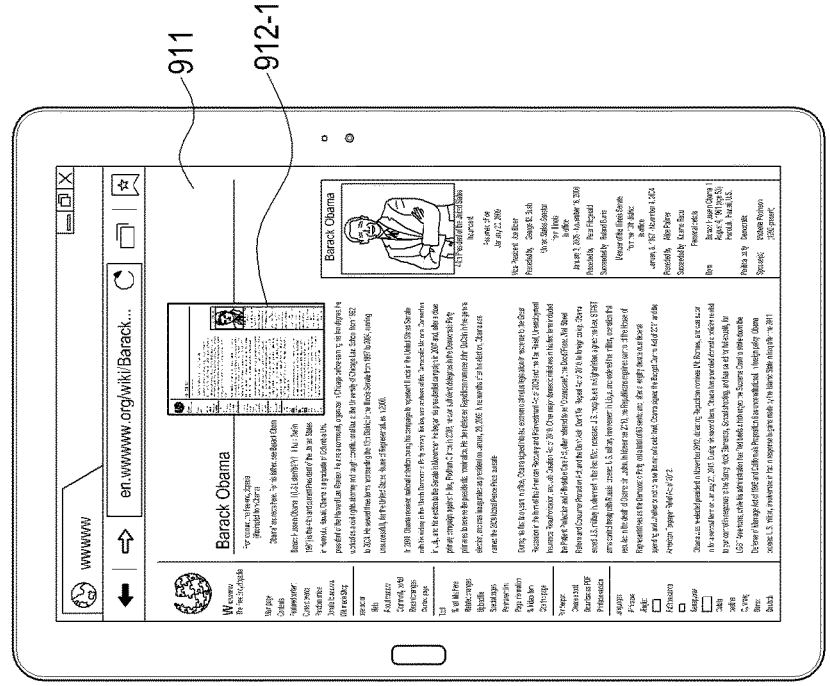

FIGS. 9A and 9B are views illustrating a process of sharing bookmarked information between webpages.

The processor 190 may be configured to control the display 130 to display a first webpage 911 on the web browser screen in operation 910 of FIG. 9A. Next, the sensing unit 180 may sense a user input for bookmarking the first webpage 911. The user input may be a gesture input previously defined, e.g., a gesture input of drawing a circle.

In response to the user input, the processor 190 may be configured to store the bookmarked information on the first webpage 911. Next, the sensing unit 180 may sense a user input for displaying a second webpage 912 on the web browser screen. The user input may be, e.g., an input of a keyword for searching for the second webpage 912 or a user input of selecting a link object on the web browser screen.

Responsive to the user input, the processor 190 may be configured to control the display 130 to display the second webpage 912 on the web browser screen as in operation 920 of FIG. 9A. Next, the sensing unit 180 may sense a user input for bookmarking the second webpage 912. The user input may be a gesture input previously defined, e.g., a gesture input of drawing a circle.

In response to the user input, the processor 190 may be configured to store the bookmarked information of the second webpage 912.

The processor 190 may be configured to connect the first webpage 911 and the second webpage 912 with each other. For example, the processor 190 may be configured to control the memory 150 to store the bookmarked information of the first webpage 911 and the bookmarked information of the second webpage 912, with the bookmarked information connected with each other. As an example, the processor 190 may be configured to control the memory 150 to store the domain name or link address of the first webpage 911 and the domain name or link address of the second webpage 912, with the domain names or link addresses mapped with each other.

Next, the sensing unit 180 may sense a user input for redisplaying the first webpage 911 on the web browser screen. The user input may be, e.g., an input of a keyword for searching for the first webpage 911 or a user input of selecting a link object on the web browser screen.

As in operation 930 of FIG. 9B, in response to the user input, the processor 190 may be configured to control the display 130 to display the identification information 912-1 of the second webpage connected with the first webpage 911, together with the first webpage 911, on the web browser screen. In this case, the identification information 912-1 of the second webpage may also be displayed in response to an additional user input, with the first webpage 911 displayed.

The sensing unit 180 may sense a user input for redisplaying the second webpage 912 on the web browser screen. The user input may be, e.g., an input of a keyword for searching for the second webpage 912 or a user input of selecting a link object on the web browser screen.

As in operation 940 of FIG. 9B, in response to the user input, the processor 190 may be configured to control the display 130 to display the identification information 911-1 of the first webpage connected with the second webpage 912, together with the second webpage 912, on the web browser screen. In this case, the identification information 911-1 of the first webpage may also be displayed in response to an additional user input, with the second webpage 912 displayed.

Figure 10A:
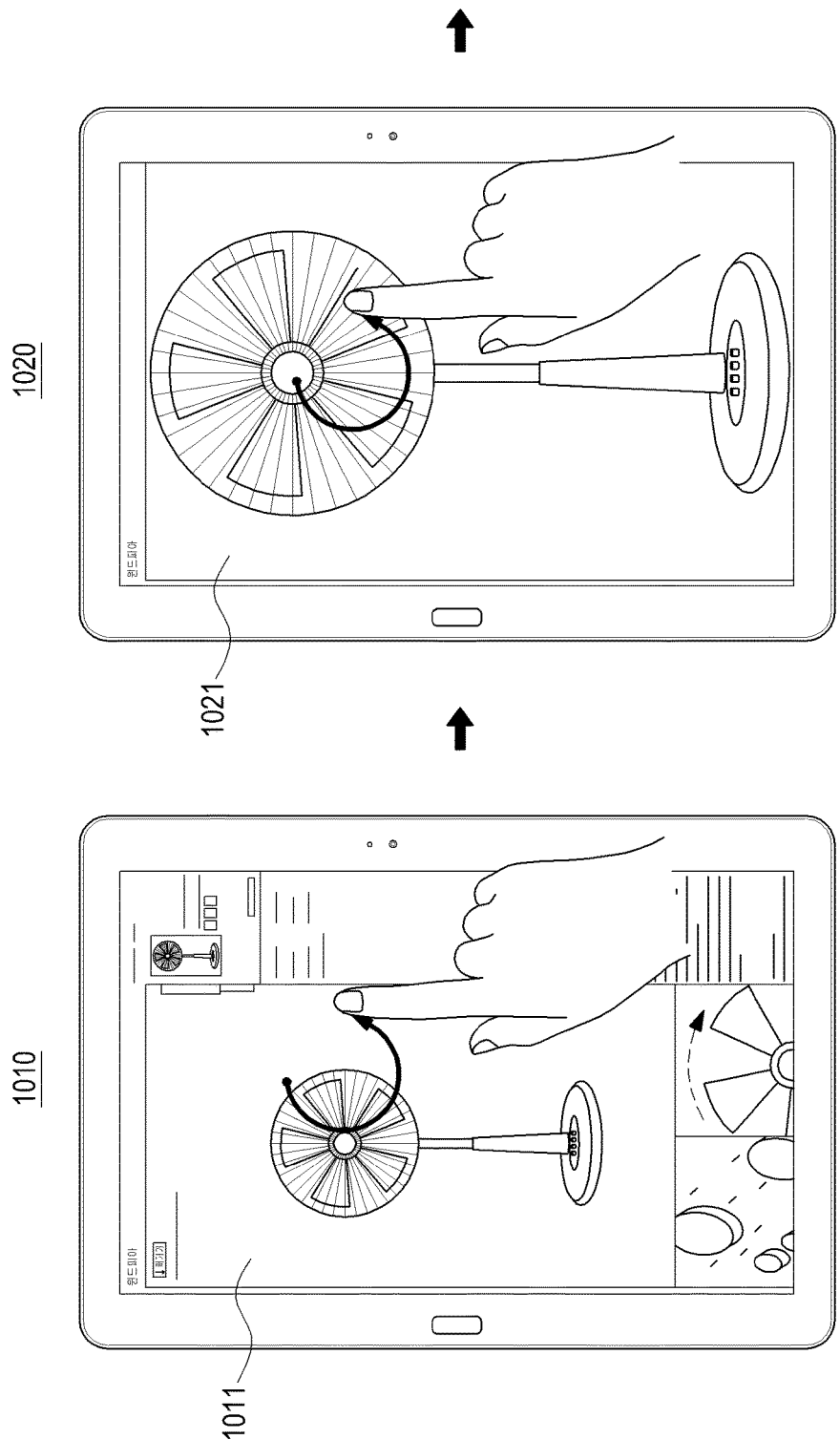

FIGS. 10A and 10B are views illustrating a process of sharing bookmarked information between electronic documents and images.

In operation 1010 of FIG. 10A, the processor 190 may run a first viewer application (e.g., a web browser application) and may control the display 130 to display a first electronic document (e.g., a webpage) 1011. Next, the sensing unit 180 may sense a user input for bookmarking the first electronic document 1011. The user input may be a gesture input previously defined, e.g., a gesture input of drawing a circle. In response to the user input, the processor 190 may bookmark the first electronic document 1011.

Next, the user may image-capture an object using the image obtaining unit 110 of the electronic device 100. As in operation 1020 of FIG. 10A, the processor 190 may run a second viewer application (e.g., a gallery application) and may be configured to control the display 130 to display a first image 1021 in response to a user input to display the captured image. Next, the sensing unit 180 may sense a user input for bookmarking the first image 1021. The user input may be a gesture input previously defined, e.g., a gesture input of drawing a circle.

In response to the user input, the processor 190 may be configured to cause the first image 1021 to be bookmarked. Next, the sensing unit 180 may sense a user input for displaying a second electronic document (e.g., a webpage) 1012.

As in operation 1030 of FIG. 10B, the processor 190 may run the first viewer application (e.g., a web browser application) and may be configured to control the display 130 to display the second electronic document 1012 in response to a user input. Next, the sensing unit 180 may sense a user input to display identification information of at least one of the bookmarked webpages. The user input may be, e.g., a touch input of touching and holding a position on the second electronic document 1012.

As in operation 1040 of FIG. 10B, in response to a user input, the processor 190 may be configured to control the display 130 to display the identification information 1011-1 of the bookmarked first electronic document and the identification information 1021-1 on the bookmark first image with respect to the touched position. For example, the identification information 1021-1 of the second image may be, e.g., the second image whose displayed area is shrunken, a link address of the second image, or metadata information on the second image.

The sensing unit 180 may sense a user input of selecting the identification information 1012-1 of the first image, with the identification information 1011-1 of the bookmarked first electronic document and the identification information on the bookmarked first image displayed. In response to the user input, the processor 190 may run the first viewer application related to the first image and may be configured to control the display 130 to display the first image 1021, with the first image 1021 enlarged on the viewer screen.

As such, the user may display a bookmarked electronic document or image quickly and simply through an intuitive and highly accessible user interface. According to the prior art, the user needs to search a complicated bookmark menu or rely on his memory to display a bookmarked electronic document or image. However, an example embodiment may get rid of the user inconvenience.

Figure 11A:
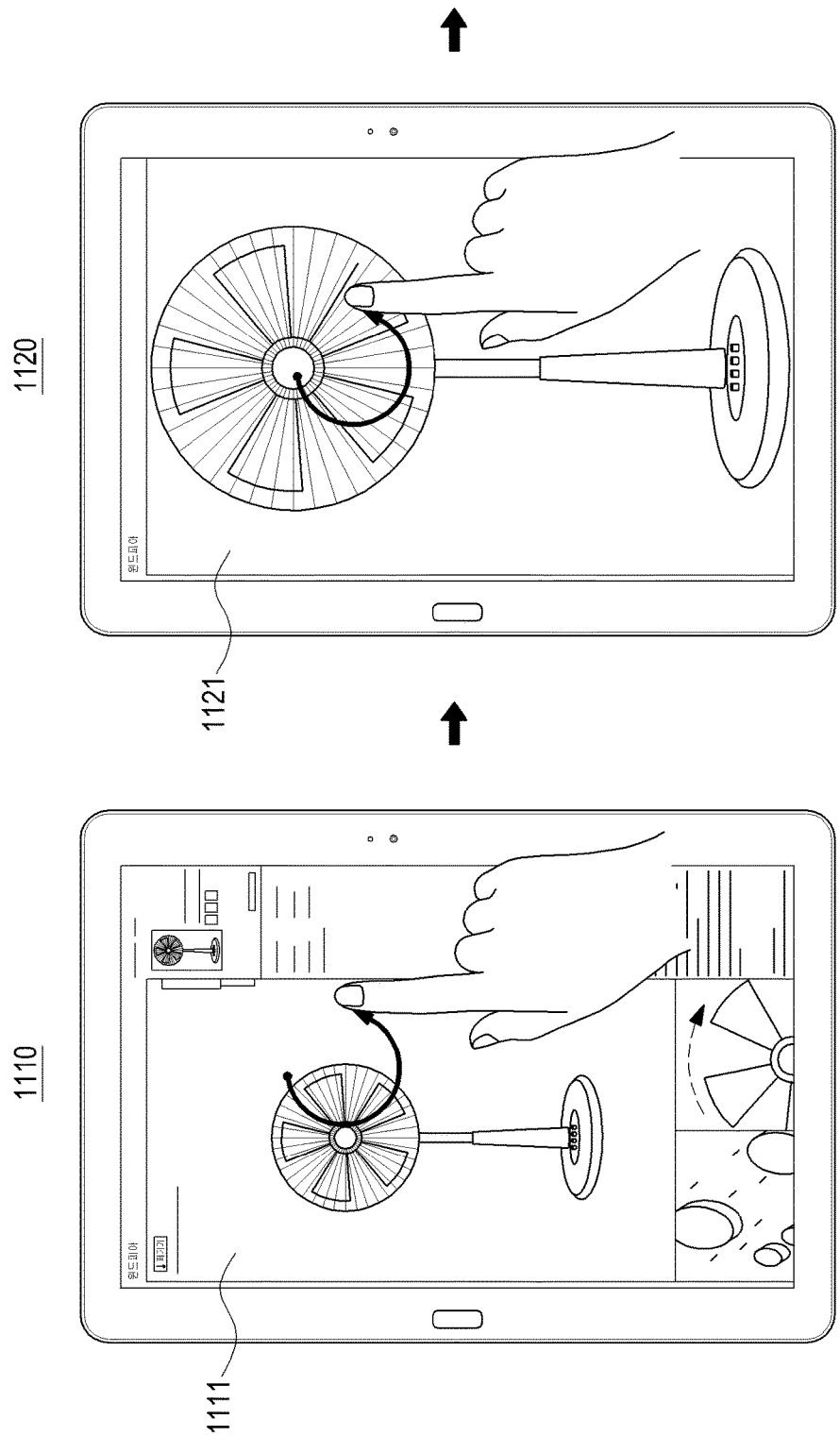
FIGS. 11A and 11B are views illustrating a process of sharing bookmarked information between electronic documents and images.
Figure 11B:
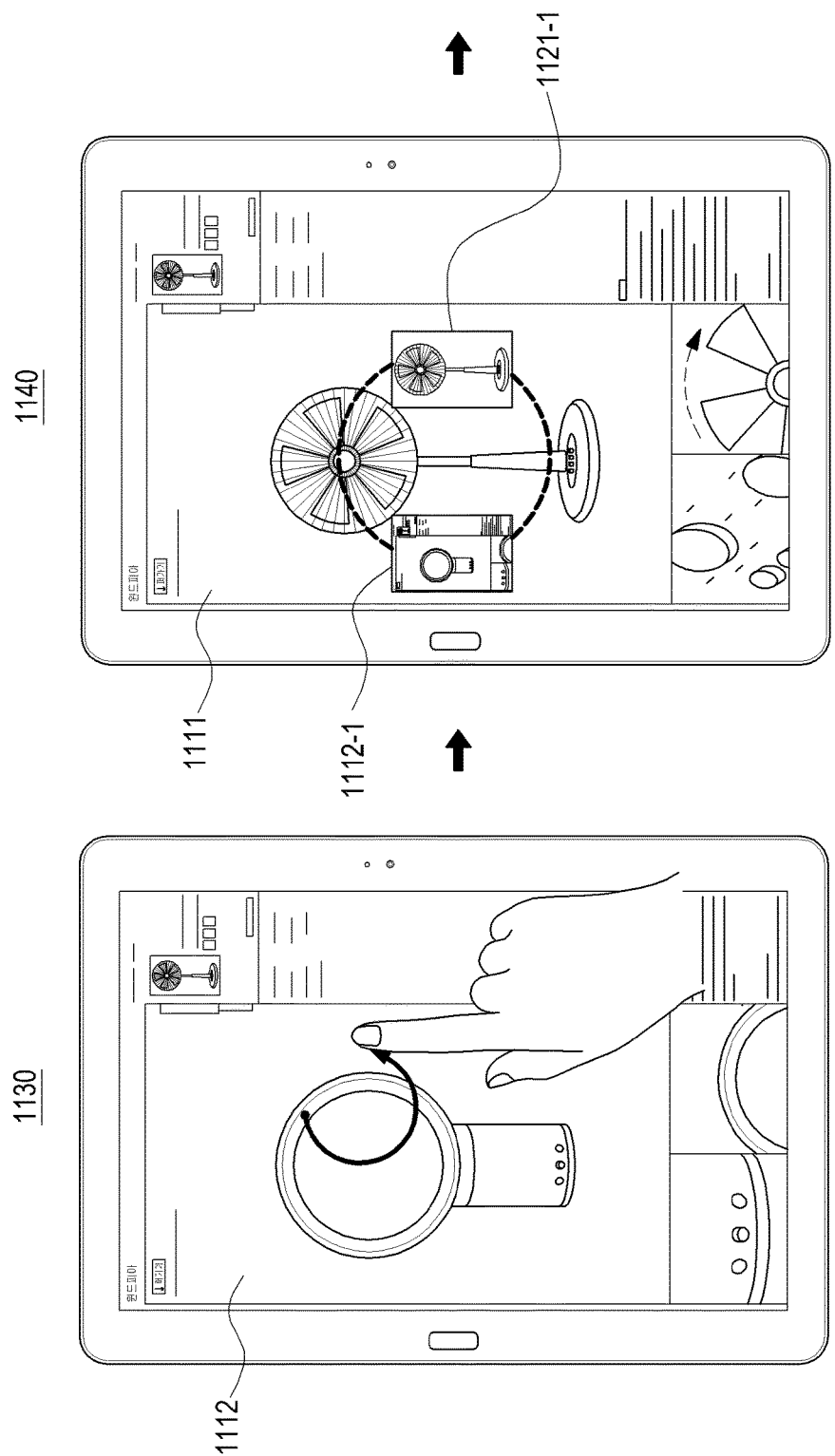

FIGS. 11A and 11B are views illustrating a process of sharing bookmarked information between electronic documents and images.

In operation 1110 of FIG. 11A, the processor 190 may run a first viewer application (e.g., a web browser application) and may be configured to control the display 130 to display a first electronic document (e.g., a webpage) 1111. In response to the user input through the sensing unit 180 to bookmark the first electronic document 1111, the processor 190 may be configured to cause the first electronic document 1111 to be bookmarked. The user input may be a first gesture input previously defined, e.g., a gesture input of drawing a circle. Next, the sensing unit 180 may sense a user input for displaying the first image 1121.

As in operation 1120 of FIG. 11A, the processor 190 may run a second viewer application (e.g., a gallery application) and may be configured to control the display 130 to display the first image 1121 in response to a user input. Next, in response to a user input through the sensing unit 180 to bookmark the first image 1121, the processor 190 may be configured to cause the first image 1121 to be bookmarked. The user input may be a first gesture input previously defined, e.g., a gesture input of drawing a circle. Next, the sensing unit 180 may sense a user input for displaying a second electronic document (e.g., a webpage) 1112.

As in operation 1130 of FIG. 11B, the processor 190 may run the first viewer application (e.g., a web browser application) and may be configured to control the display 130 to display the second electronic document (e.g., a webpage) 1112 in response to a user input. In response to a user input through the sensing unit 180 to bookmark the second electronic document 1112, the processor 190 may be configured to cause the second electronic document 1112 to be bookmarked. The user input may be a first gesture input previously defined, e.g., a gesture input of drawing a circle.

When the first electronic document 1111, the first image 1121, and the second electronic document 1112 are bookmarked through the same first gesture, the processor 190 may be configured to mutually connect the first electronic document 1111, the first image 1121, and the second electronic document 1112. For example, the processor 190 may be configured to control the memory 150 to store the bookmarked information on each of the first electronic document 1111, the first image 1121, and the second electronic document 1112, with the bookmarked information connected with each other.

Next, the sensing unit 180 may sense a user input to redisplay the first electronic document 1111, with the first electronic document 1111, the first image 1121, and the second electronic document 1112 connected with one another.

As in operation 1140 of FIG. 11B, the processor 190 may run the first viewer application (e.g., a web browser application) and may be configured to control the display 130 to display the first electronic document 1111 in response to a user input.

In this case, the processor 190 may be configured to control the display 130 so that, even without a user input, the identification information 1112-1 of the bookmarked second electronic document and the identification information 1121-1 of the first image, connected with the first electronic document 1111, may be automatically displayed together. The processor 190 may also be configured to control the display 130 so that the identification information of the bookmarked first electronic document and the identification information of the second image, connected with the second electronic document, may be displayed together in response to a user input through the sensing unit 180.

The bookmarked electronic documents or bookmarked images may be grouped into a first group through a first user gesture among a plurality of predetermined gestures, and when one of the electronic documents or images included in the first group is displayed, identification information of another electronic document and identification information of other images in the first group may be displayed together. Further, the electronic document or images may be bookmarked through a second user gesture of the plurality of predetermined gestures. In such case, the bookmarked electronic documents or bookmarked images may be grouped into a second group through a second user gesture among a plurality of predetermined gestures, and when one of the electronic documents or images included in the second group is displayed, identification information of another electronic document and identification information of other images in the second group may be displayed together.

As another example, user input may be conducted on a first area of a plurality of predetermined areas on the screen to bookmark electronic documents or images. In such case, the electronic document or images bookmarked through the user input on the first area may be grouped into a first group, and when one of the electronic document or images included in the first group is displayed, identification information of another electronic document and identification information of another image in the first group may be displayed together. Further, user input may be conducted on a second area of a plurality of predetermined areas on the screen to bookmark electronic documents or images. In such case, the electronic document or images bookmarked through the user input on the second area may be grouped into a second group, and when one of the electronic document or images included in the second group is displayed, identification information of another electronic document and identification information of another image in the second group may be displayed together.

Even when the applications related to the bookmarked electronic document or bookmarked image are ended, the information connected between the bookmarks may be retained in the memory 150 or the cloud (not shown), so that, even when one of the applications related to the bookmarked electronic document or bookmarked image is run to display the electronic document or image, the identification information of the electronic document and identification information of the image bookmarked in the same group may be displayed together.

Figure 12A:
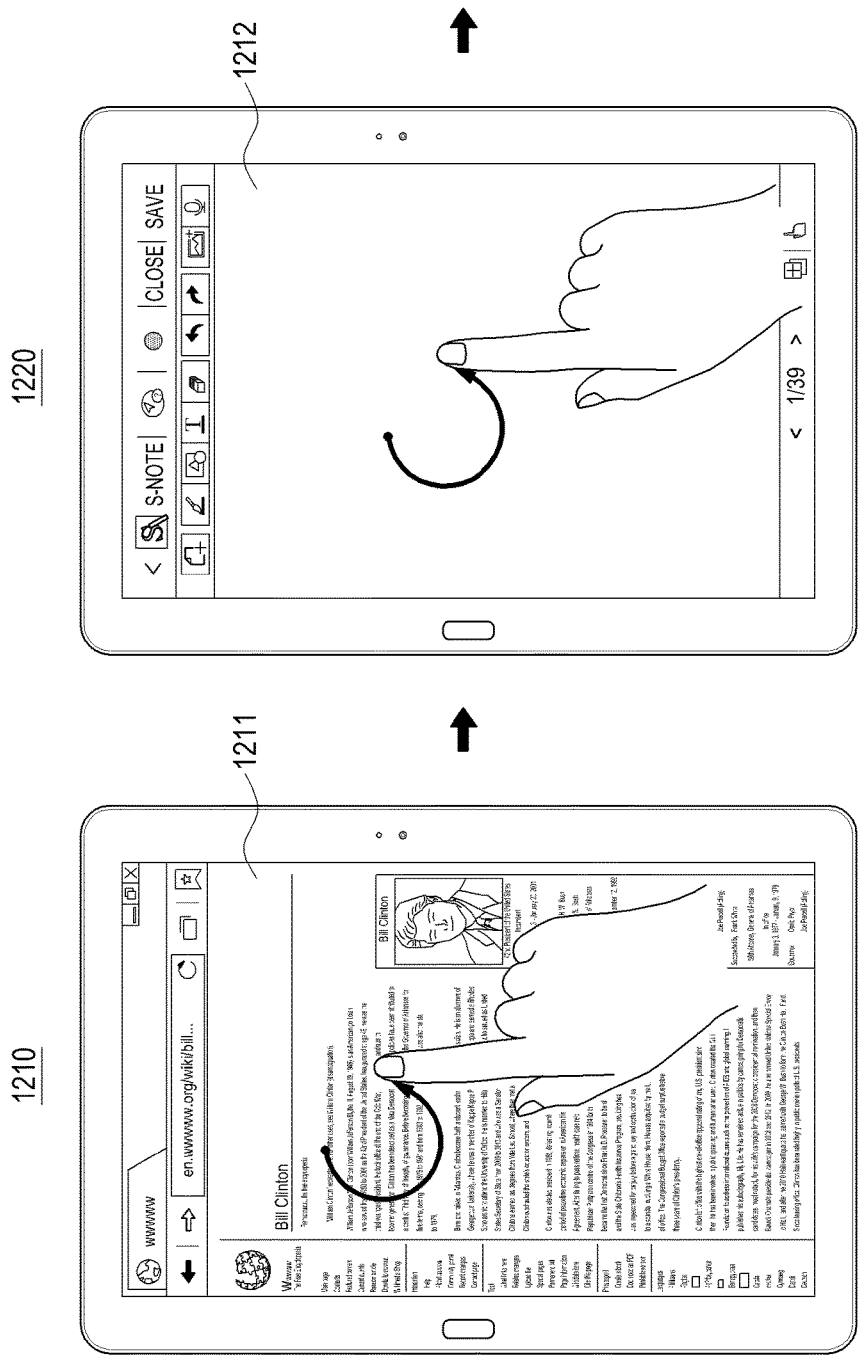
FIGS. 12A to 12C are views illustrating a process of sharing bookmarked information between electronic documents and files.
Figure 12B:
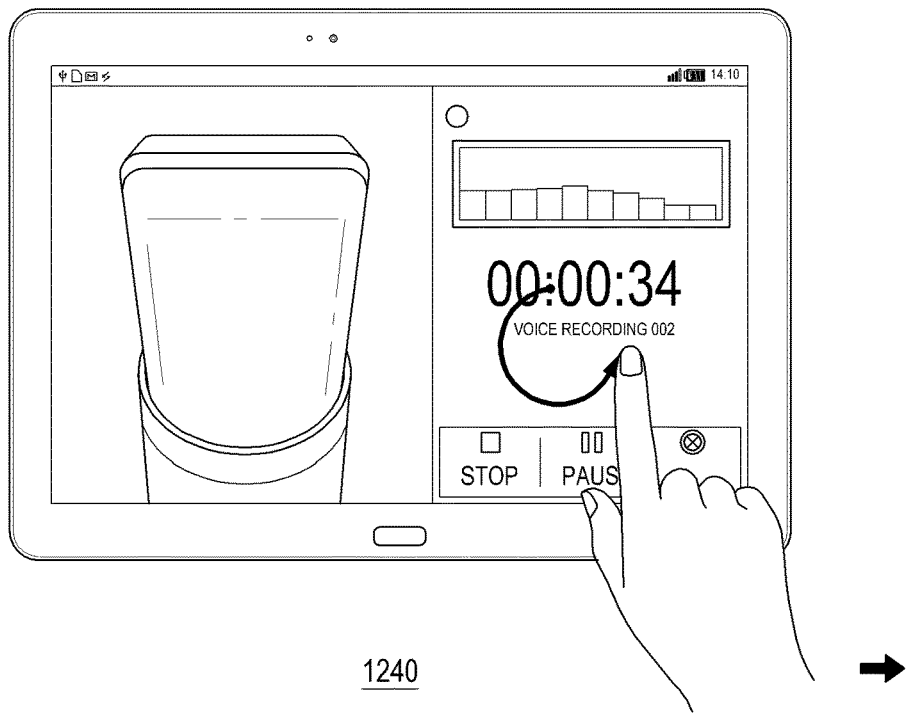
Figure 12B:
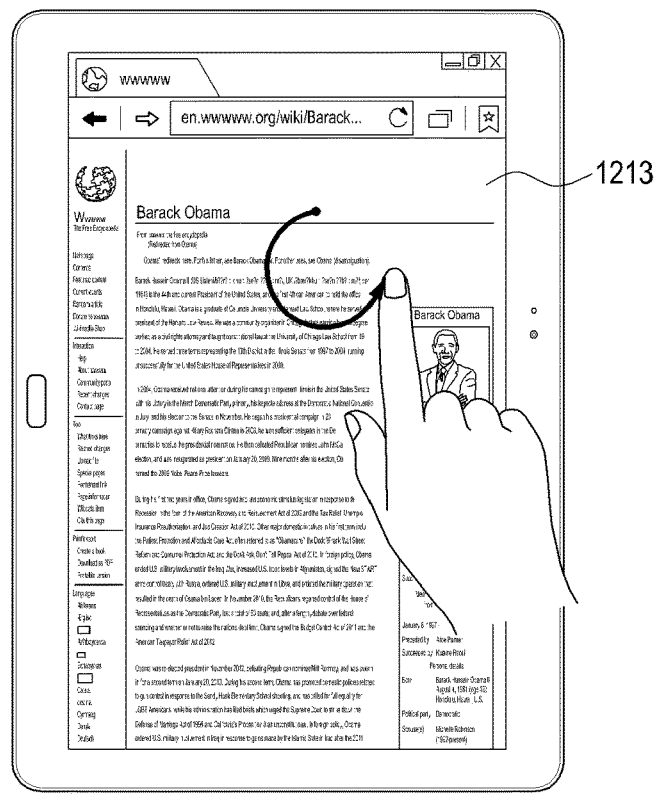
Figure 12C:
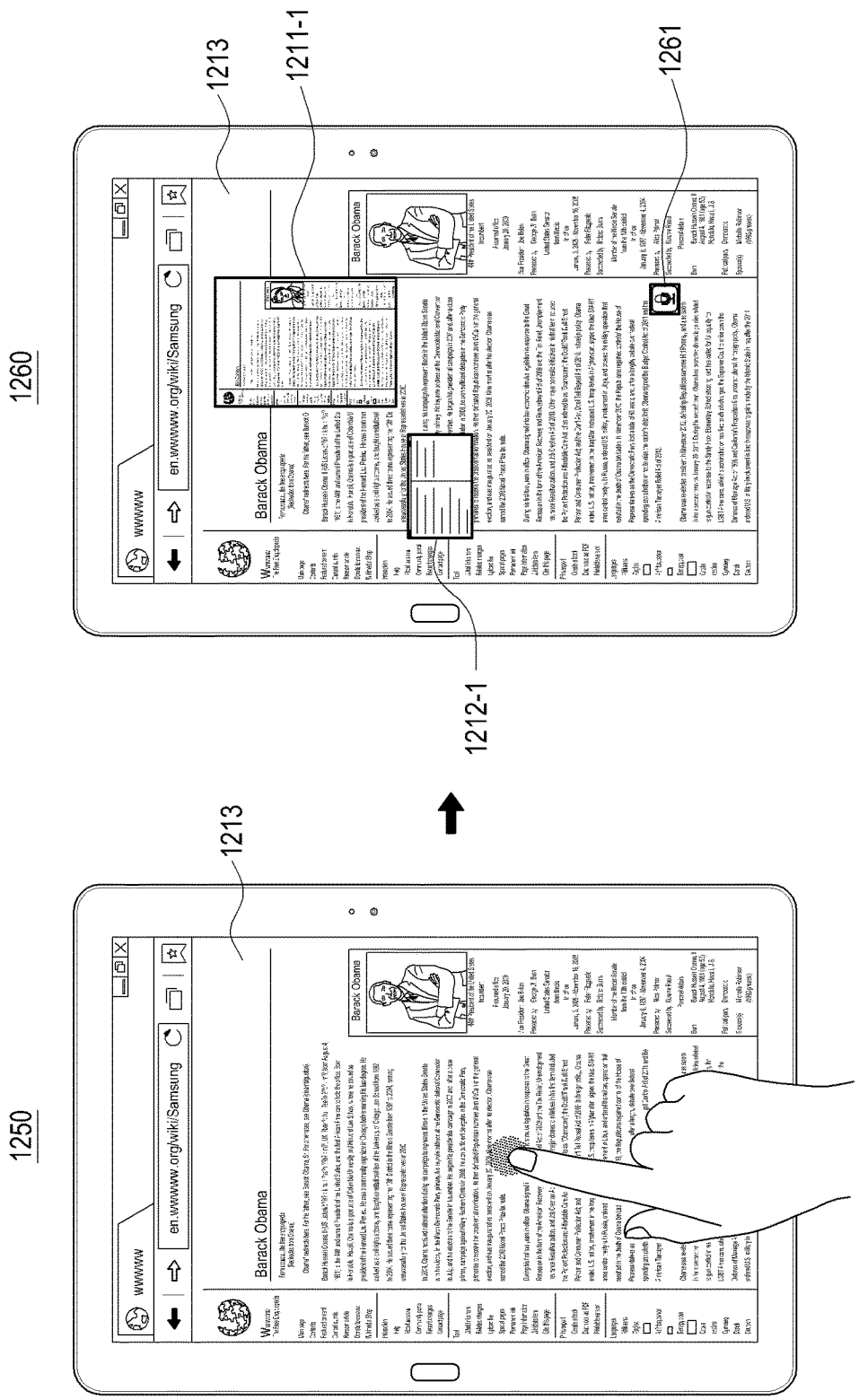

FIGS. 12A to 12C are views illustrating a process of sharing bookmarked information between electronic documents and files.

In operation 1210 of FIG. 12A, the processor 190 may run a first viewer application (e.g., a web browser application) and may be configured to control the display 130 to display a first electronic document (e.g., a webpage) 1211. In response to the user input through the sensing unit 180 to bookmark the first electronic document 1211, the processor 190 may be configured to cause the first electronic document 1211 to be bookmarked. The user input may be a first gesture input previously defined, e.g., a gesture input of drawing a circle. Next, the sensing unit 180 may sense a user input to display a second electronic document (e.g., a memo document) 1212.

As in operation 1220 of FIG. 12A, the processor 190 may run the second viewer application (e.g., a memo application) and may be configured to control the display 130 to display the second electronic document 1212 in response to a user input. The second electronic document 1212 may include, e.g., text input or handwriting image input by the user or an image or part of video copied by the user. In response to the user input through the sensing unit 180 to bookmark the second electronic document 1212, the processor 190 may be configured to cause the second electronic document 1212 to be bookmarked. The user input may be a first gesture input previously defined, e.g., a gesture input of drawing a circle. Next, the sensing unit 180 may sense a user input to run a third application (e.g., a recording application).

As in operation 1230 of FIG. 12B, in response to the user input, the processor 190 may be configured to control the display 130 to display a running screen of the third application. Next, the sensing unit 180 may sense a user input to bookmark a first file provided through the third application. The user input may be, e.g., a gesture input of drawing a circle on the screen while the first file is running or generated. The user input may be a user input of selecting the first file from a file list.

In response to the user input, the processor 190 may be configured to cause the first file to be bookmarked. For example, the processor 190 may be configured to store, as bookmarked information on the first file, at least one of a position of the first file, a link address, and a file name, in the bookmark database.

Next, the sensing unit 180 may sense a user input for displaying a third electronic document (e.g., a webpage) 1213.

As in operation 1240 of FIG. 12B, the processor 190 may run the first viewer application (e.g., a web browser application) and may be configured to control the display 130 to display the third electronic document (e.g., a webpage) 1213 in response to a user input. Next, the sensing unit 180 may sense a user input for bookmarking the third electronic document 1213. The user input may be a first gesture input previously defined, e.g., a gesture input of drawing a circle.

When the first electronic document 1211, the second electronic document 1212, the first file, and the third electronic document 1213 are bookmarked through the same first gesture input, the processor 190 may be configured to mutually connect the first electronic document 1211, the second electronic document 1212, the first file, and the third electronic document 1213. For example, the processor 190 may be configured to control the memory 150 to store the bookmarked information of each of the first electronic document 1211, the second electronic document 1212, the first file, and the third electronic document 1213, with the bookmarked information connected with each other.

Next, as in operation 1250 of FIG. 12C, the sensing unit 180 may sense a user input to display the identification information of the bookmarked electronic documents 1211 and 1212 and the file, with the third electronic document 1213 displayed. The user input may be a gesture input previously defined, e.g., a gesture input of drawing a check ('✓') or "V" on the third electronic document 1213. The user input may be a touch input, e.g., a touch-and-hold input that maintains a touch for a predetermined time. The user input may be a voice input previously defined, e.g., a voice speaking out "bring up a bookmark." Even without the user input, when the third electronic document 1213 is displayed, the identification information on the bookmarked resources may be automatically displayed.

As in operation 1260 of FIG. 12C, in response to a user input, the processor 190 may be configured to control the display 130 to display the identification information 1211-1 of the first electronic document, the identification information 1212-1 of the second electronic document, and the identification information 1261 of the first file. In this case, the identification information 1261 of the first file may be, e.g., at least one of a file name and an image related to the file.

For example, in operation 1240 of FIG. 12B, in response to a user input to bookmark the third electronic document 1213, the processor 190 may be configured to mutually connect the first electronic document 1211, the second electronic document 1212, the first file, and the third electronic document 1213, and as in operation 1260 of FIG. 12C, the processor 190 may be configured to control the display 130 to display the identification information 1211-1 of the first electronic document, the identification information 1212-1 of the second electronic document, and the identification information 1261 of the first file.

What is bookmarked is not limited to those in the above-described examples, and various resources may be bookmarked. For example, various resources, such as webpages, memo documents, multimedia files, voice files, motion pictures, images or editable documents, may be bookmarked.

FIGS. 13A to 13D are views illustrating various examples of information for identifying bookmarked webpages.

Figure 13A:
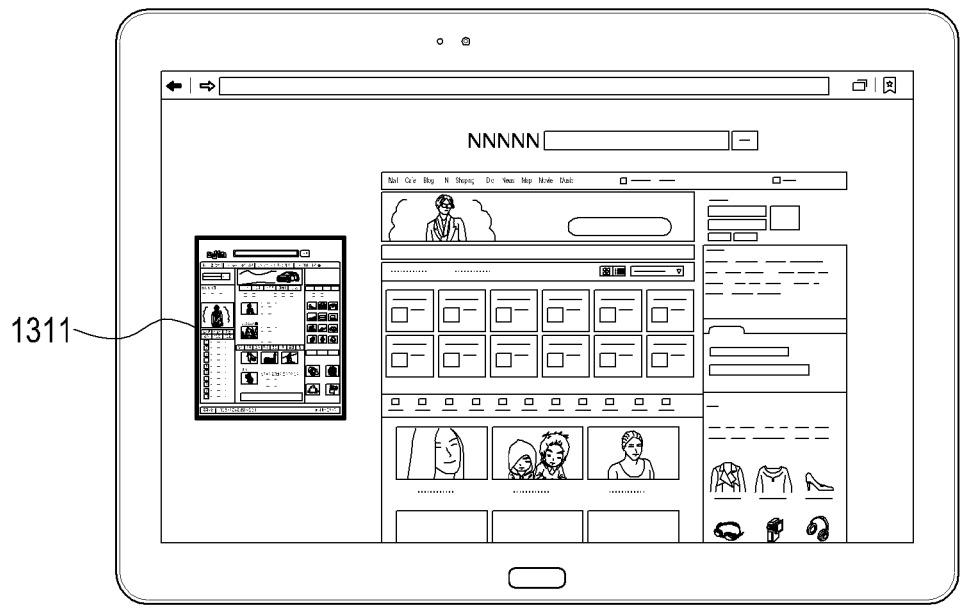
FIGS. 13A to 13D are views illustrating various examples of information for identifying bookmarked webpages.
Figure 13A:

In operation 1310 of FIG. 13A, the identification information of a bookmarked webpage may be displayed in the form of a thumbnail 1311.

Further, as in operation 1320 of FIG. 13A, the identification information of the bookmarked webpage may be displayed in the form of text 1312. In this case, the content of the text may be at least one of a domain name, a link address, and a webpage title.

Figure 13B:
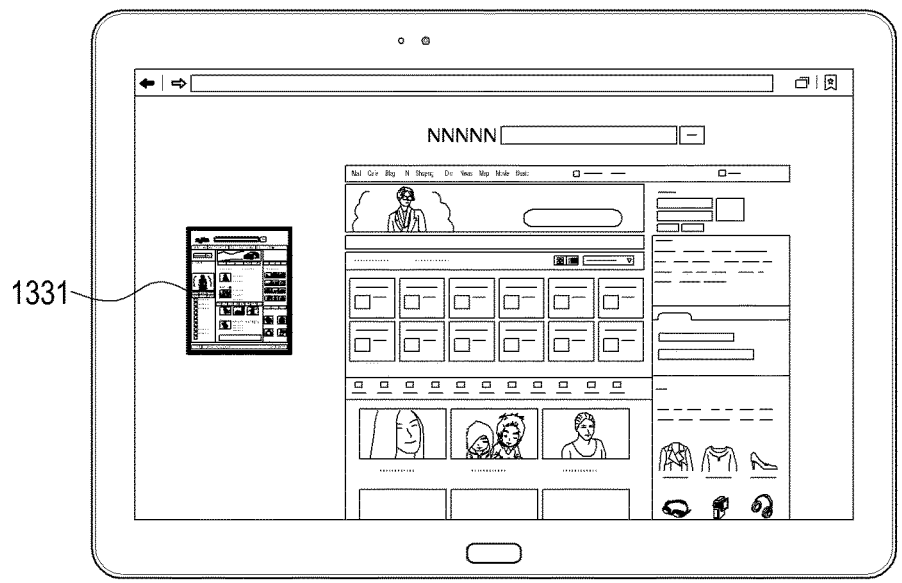
Figure 13B:
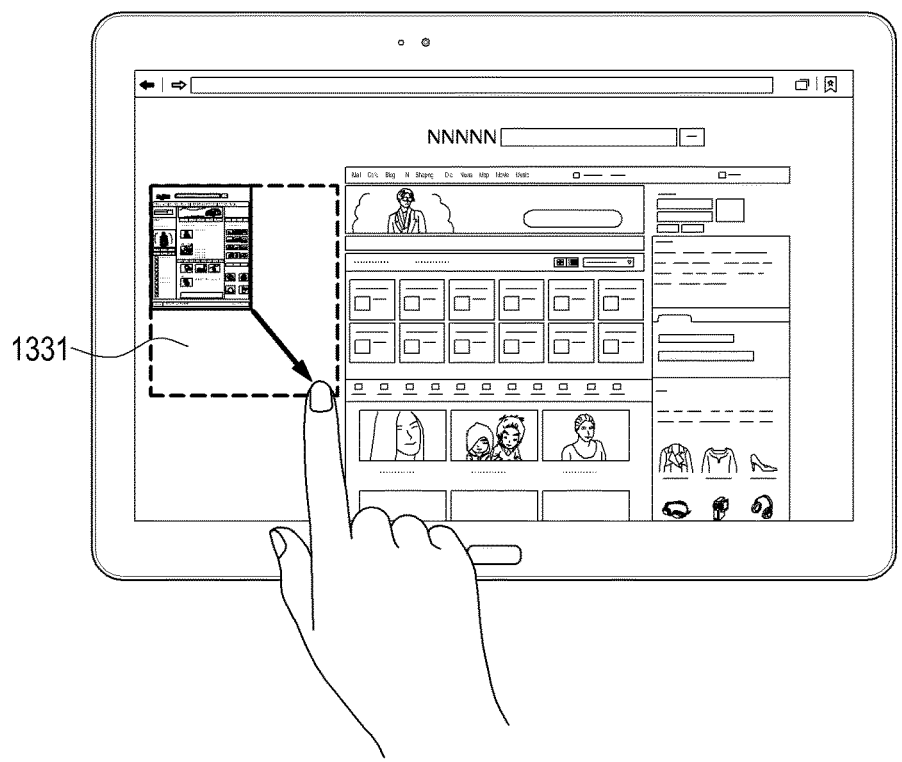
Figure 13C:
Figure 13C:
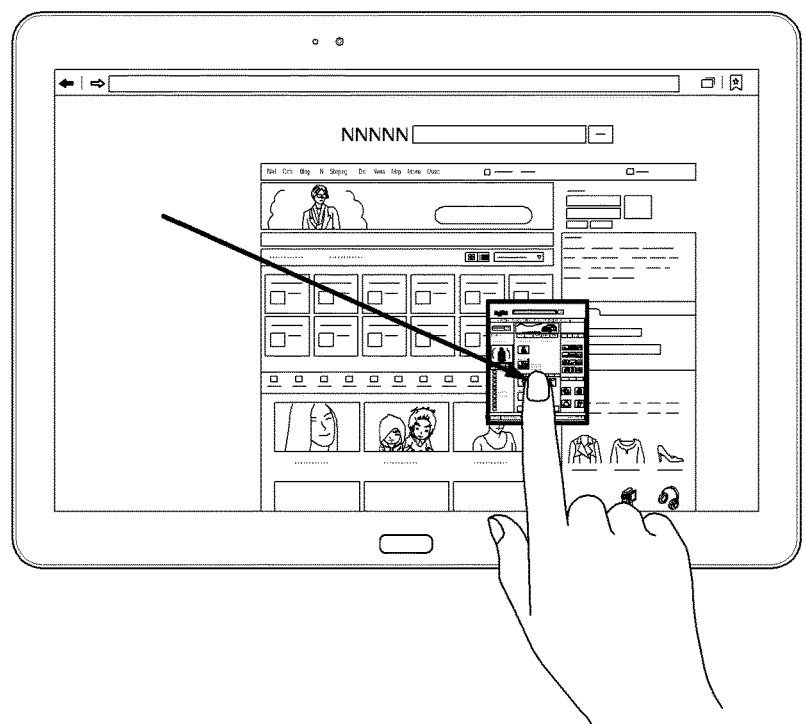

Further, as in operation 1330 of FIG. 13B, the identification information on the bookmarked webpage may be displayed in the form of an Iframe 1331. In this case, in response to a user input, the size of the Iframe 1331 and the content of the webpage contained in the Iframe 1331 may be changed. For example, in response to a touch-and-drag of touching and then dragging an edge of the Iframe 1331, the processor 190 may be configured to increase the size of the Iframe 1331 as in operation 1340 of FIG. 13B. In response to a touch-and-drag gesture on the Iframe 1331, the processor 190 may be configured to control the display 130 so that the webpage included in the Iframe 1331 may be scrolled and displayed as in operation 1350 of FIG. 13C. In response to a user gesture of dragging a touch maintained on the Iframe 1331 and releasing the touch at a predetermined position, the processor 190 may be configured to move the Iframe 1331 to the touch releasing position as in operation 1360 of FIG. 13C.

Figure 13D:
Figure 13D:
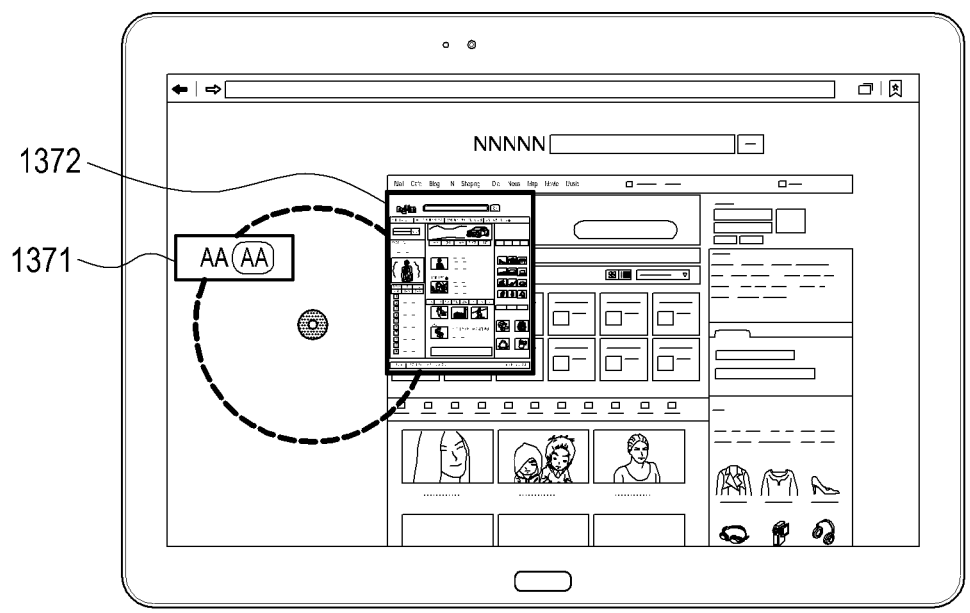

Further, as in operation 1360 of FIG. 13D, when a plurality of webpages are bookmarked, information 1361, 1362, and 1363 of the bookmarked webpages may be displayed, included in a bookmark list. In this case, the identification information 1361, 1362, and 1363 of the webpages included in the bookmark list may be displayed in the form of text, and in this case, the content of the text may be at least one of a domain name, a link address, and a webpage title.

Further, as in operation 1370 of FIG. 13D, when a plurality of webpages are bookmarked, information 1371 and 1372 of the bookmarked webpages may be displayed in the form of a thumbnail or Iframe. For example, the identification information 1371 and 1372 of the webpages may be moved in response to the user's gesture input, and as the webpage identification information is moved, the type or size of the identification information of the webpages may be changed. For example, the identification information

1372 of the webpage positioned closer to the center of the screen may be displayed in the form of a thumbnail or Iframe, and the identification information 1371 of the webpage positioned closer to an edge of the screen may be displayed in the form of text.

Figure 14:
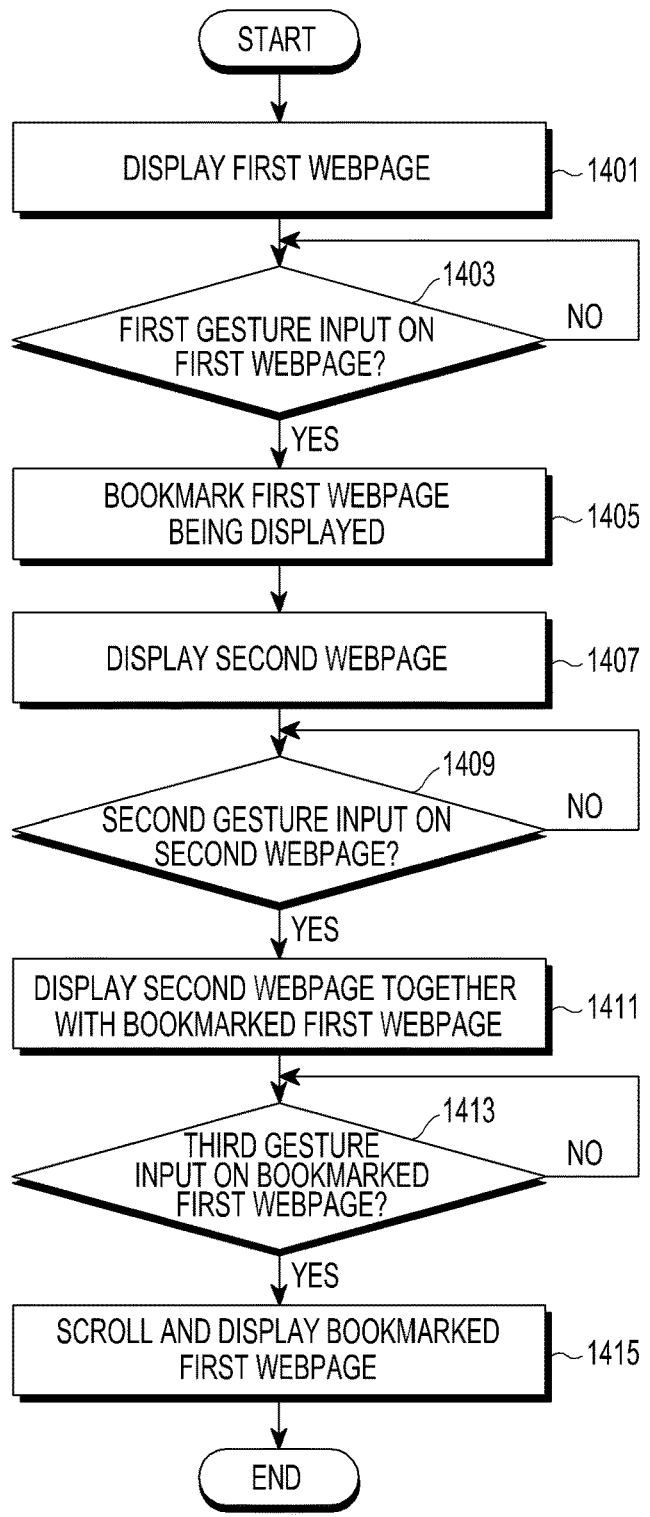
FIGS. 14 to 17 are flowcharts illustrating methods for displaying a webpage.

FIG. 14 is a flowchart illustrating a method for displaying a webpage.

The electronic device 100 may display a first webpage (1401).

When a first gesture is input on the first webpage (1403), the electronic device 100 may bookmark the first webpage being displayed in response to the first gesture input (1405).

The electronic device 100 may display a second webpage (1407).

When a second gesture is input on the second webpage (1409), the electronic device 100 may display identification information of the bookmarked first webpage together with the second webpage in response to the second gesture input (1411). In this case, the identification information of the bookmarked first webpage may be, e.g., a first webpage whose display area has been shrunken.

When a third gesture is input on the bookmarked first webpage (1413), the electronic device 100 may scroll and display the bookmarked first webpage in response to the third gesture input (1415).

Figure 15:
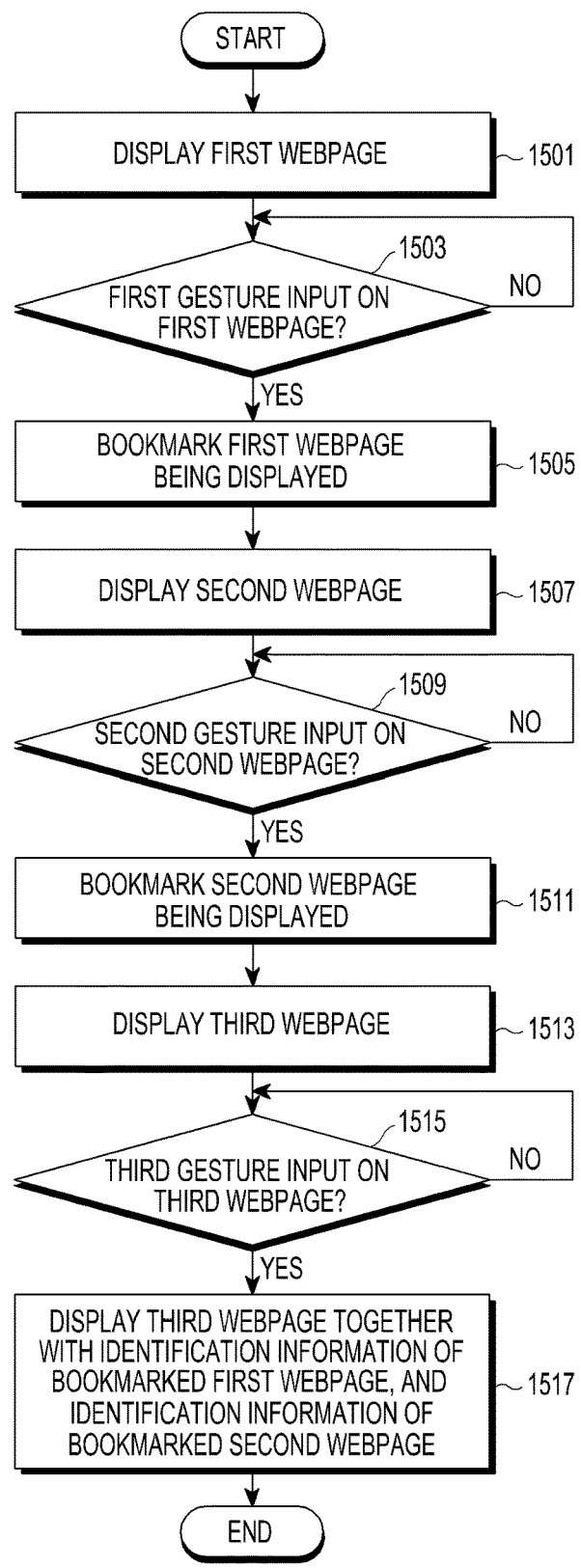

FIG. 15 is a flowchart illustrating a method for displaying a webpage.

First, the electronic device 100 may display a first webpage (1501).

When a first gesture is input on the first webpage (1503), the electronic device 100 may bookmark the first webpage being displayed in response to the first gesture input (1505).

The electronic device 100 may display a second webpage (1507).

When a second gesture is input on the second webpage (1509), the electronic device 100 may bookmark the first webpage being displayed in response to the second gesture input (1511).

The electronic device 100 may display a third webpage (1513).

When a third gesture is input on the third webpage (1515), the electronic device 100 may display identification information of the bookmarked first webpage and the identification information of the bookmarked third webpage together with the third webpage in response to the third gesture input (1517).

Figure 16:
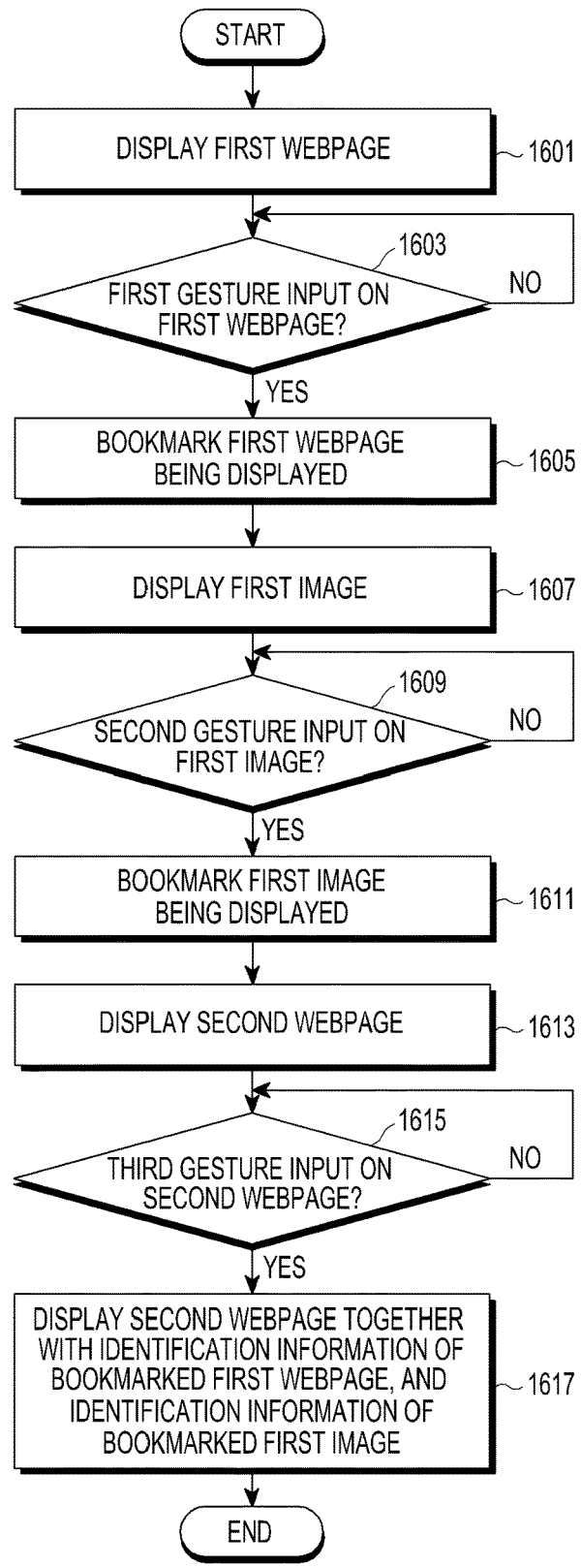

FIG. 16 is a flowchart illustrating a method for displaying a webpage.

First, the electronic device 100 may display a first webpage (1601).

When a first gesture is input on the first webpage (1603), the electronic device 100 may bookmark the first webpage being displayed in response to the first gesture input (1605).

The electronic device 100 may display a first image (1607).

When a second gesture is input on the first image (1609), the electronic device 100 may bookmark the first image being displayed in response to the second gesture input (1611).

The electronic device 100 may display a third webpage (1613).

When a third gesture is input on the third webpage (1615), the electronic device 100 may display identification information of the bookmarked first webpage and the identification information of the bookmarked first image together with the third webpage in response to the third gesture input (1617).

Figure 17:
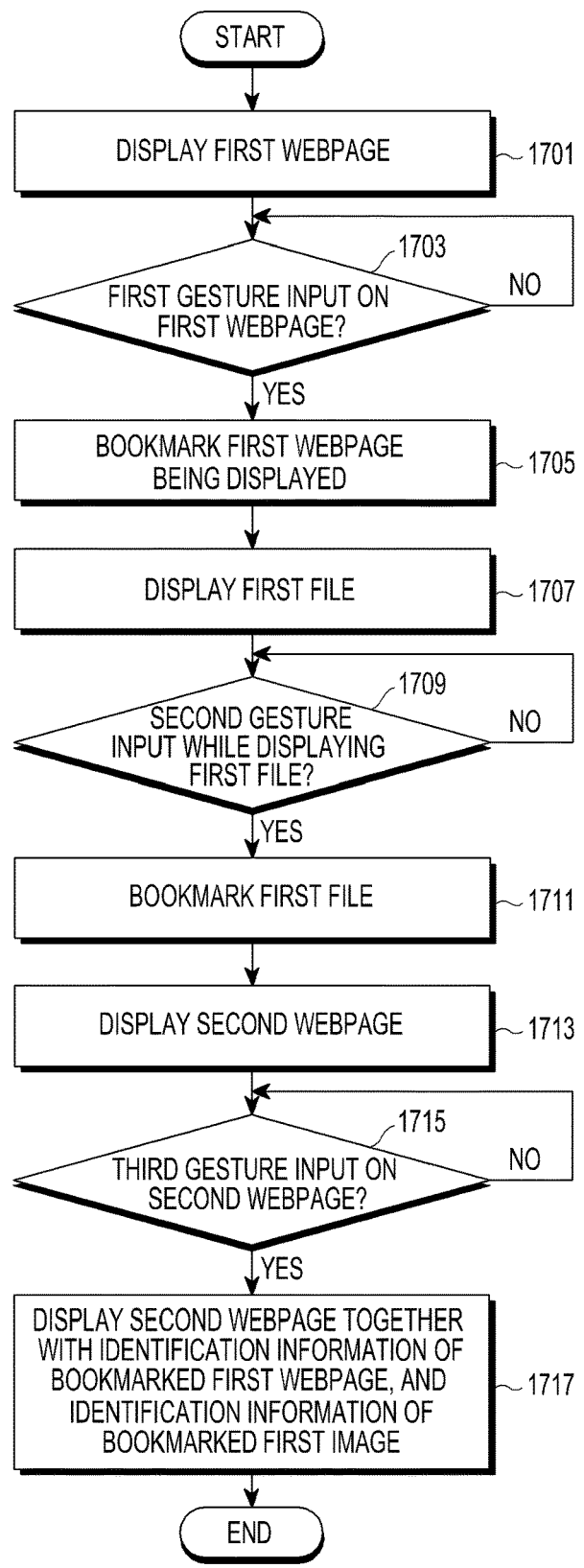

FIG. 17 is a flowchart illustrating a method for displaying a webpage.

First, the electronic device 100 may display a first webpage (1701).

When a first gesture is input on the first webpage (1703), the electronic device 100 may bookmark the first webpage being displayed in response to the first gesture input (1705).

The electronic device 100 may provide and/or display a first file (1707). Here, the provision of the first file may include running of the first file or display of part of the identification information of the first file (e.g., an icon of the first file, a title of the first file, or content contained in the first file (e.g., an image, motion picture, or text).

When a second gesture is input on the first image (1709-), the electronic device 100 may bookmark the first file being provided in response to the second gesture (1711).

The electronic device 100 may display a third webpage (1713).

When a third gesture is input on the third webpage (1715), the electronic device 100 may display identification information of the bookmarked first webpage and the identification information of the bookmarked first file together with the third webpage in response to the third gesture input (1717).

Apparatuses (e.g., modules or electronic device 100) or methods (e.g., operations) according to various example embodiments may be performed by a computer (e.g., the processor 190) executing instructions contained in at least one program among programs maintained in, e.g., a computer-readable storage medium.

When the instructions are executed by a computer (e.g., the processor 190), the one or more processors may perform functions corresponding to the instructions. The computer-readable storage medium may be e.g., the memory 150.

The program may be included in, e.g., a computer-readable storage medium, such as a hardware device, such as hard discs, floppy discs, and magnetic tapes (e.g., a magnetic tape), optical media such as Compact Disc ROMs (CD-ROMs) and Digital Versatile Discs (DVDs), magneto-optical media such as floptical disks, ROMs, RAMs, Flash Memories, and/or the like. In such case, the storage medium, although generally included as part of the electronic device 100, may be equipped through a port of the electronic device 100 or may be included in an external device (e.g., a cloud, server, or other electronic device) located outside the electronic device 100. Further, the program may be split and stored in a plurality of storage media, and in such case, at least part of the plurality of storage media may be located outside the electronic device 100.

The instructions may include not only machine language codes but also high-level language codes which are executable by various computing means using an interpreter. The aforementioned hardware devices may be configured to operate as one or more software modules to carry out example embodiments of the disclosure, and vice versa.

As described above, according to various example embodiments, the user may conduct bookmarking on various resources as well as webpages, allowing for bringing up a bookmarked resource on the web browser screen in a quick and intuitive manner.

In particular, when an example embodiment applies to an electronic device having a small screen, such as a mobile device, bookmarking may be easily done by a gesture of the user, and the bookmarked resource may be rapidly and easily brought up through another gesture of the user.

While the disclosure has been illustrated and described with reference to example embodiments, it will be apparent to those of skilled in the art that various changes in form and detail may be made thereto without departing from the spirit and scope of the disclosure as defined by the following claims.

What is claimed is:

1. A method for displaying, processing, and manipulating a webpage, comprising:
displaying a first webpage on a display of an electronic device including a processor for controlling the display;
bookmarking the first webpage being displayed in response to a first gesture input on the first webpage;
displaying a second webpage on the display after the first webpage is bookmarked;
displaying the second webpage together with a smaller version of the bookmarked first webpage on the display in response to a second gesture input on the second webpage, so that the smaller version of the bookmarked first webpage is smaller than the second webpage and overlaps the second webpage;
while the second webpage is being displayed on the display in a manner overlapped by the smaller version of the bookmarked first webpage, the processor controlling scrolling within the smaller version of the bookmarked first webpage content of the bookmarked first webpage in response to a third gesture input on the smaller version of the bookmarked first webpage; and
wherein the first, second, and third gestures are all different gestures.

2. The method of claim 1, wherein bookmarking the first webpage comprises storing bookmarked information of the first webpage, wherein the bookmarked information of the first webpage includes at least one of a domain name of the first webpage, a link address of the first webpage, a thumbnail of the first webpage, a title of the first webpage, and a favicon representing a logo of the first webpage.

3. The method of claim 1, wherein when the second webpage and the bookmarked first webpage are displayed together, a size of an area where the bookmarked first webpage is displayed is smaller than a size of an area where the second webpage is displayed.

4. The method of claim 1, further comprising bookmarking a third webpage, wherein when the third webpage is bookmarked, displaying the second webpage together with the bookmarked first webpage comprises displaying at least one identification information of identification information of the second webpage, identification information of the bookmarked first webpage, and identification information of the bookmarked third webpage.

5. The method of claim 1, further comprising bookmarking a first electronic document run by a viewer application, wherein when the first electronic document is bookmarked, displaying the second webpage together with the bookmarked first webpage comprises displaying at least one identification information of identification information of the second webpage, identification information of the bookmarked first webpage, and identification information of the first electronic document.

6. The method of claim 1, further comprising bookmarking an image, wherein when the image is bookmarked, displaying the second webpage together with the bookmarked first webpage comprises displaying at least one identification information of identification information of the second webpage, identification information of the bookmarked first webpage, and identification information of the bookmarked image.

7. The method of claim 1, further comprising bookmarking a first file, wherein when the first file is bookmarked, displaying the second webpage together with the bookmarked first webpage comprises displaying at least one identification information of identification information of the second webpage, identification information of the bookmarked first webpage, and identification information of the first file.

8. The method of claim 1, further comprising receiving bookmarked information of a first electronic document from another electronic device, wherein when the bookmarked information is received, displaying the second webpage together with the bookmarked first webpage comprises displaying at least one identification information of identification information of the second webpage, identification information of the bookmarked first webpage, and identification information of the first electronic document.

9. The method of claim 1, wherein displaying the second webpage after the first webpage is bookmarked comprises displaying the second webpage on a new tab of a first web browser being run the first webpage or a second web browser different from the first web browser.

10. The method of claim 1, further comprising, in response to a fourth gesture on the bookmarked first webpage after the bookmarked first webpage is displayed, performing at least one of moving a position of the first webpage, changing a size of the first webpage, or displaying a webpage connected to a link object included in the first webpage.

11. An electronic device for displaying a webpage, comprising:
a display;
a sensor comprising sensing circuitry configured to sense a user gesture;
a memory storing programs; and
a processor configured to execute instructions included in at least one of the programs to control the device to perform operations comprising:
displaying a first webpage through the display;
bookmarking the first webpage being displayed in response to a first gesture input through the sensor on the first webpage;
displaying a second webpage through the display after the first webpage is bookmarked;
displaying the second webpage together with a smaller version of the bookmarked first webpage through the display in response to a second gesture input through the sensor on the second webpage, so that the smaller version of the bookmarked first webpage is smaller than the second webpage and overlaps the second webpage; and
while the second webpage is being displayed in a manner overlapped by the smaller version of the bookmarked first webpage, scrolling within the smaller version of the bookmarked first web page content of the bookmarked first webpage in response to a third gesture input through the sensor on the bookmarked first webpage; and
wherein the first, second, and third gestures are all different gestures.

12. The electronic device of claim 11, wherein the processor, when bookmarking the first webpage, is configured to execute instructions to store bookmarked information of the first webpage, wherein the bookmarked information of the first webpage includes at least one of a domain name of the first webpage, a link address of the first webpage, a thumbnail of the first webpage, a title of the first webpage, and a favicon representing a logo of the first webpage.

13. The electronic device of claim 11, wherein the processor, when the second webpage together with the bookmarked first webpage is displayed, executes instructions to control the display so that a size of an area where the bookmarked first webpage is displayed is smaller than a size of an area where the second webpage is displayed.

14. The electronic device of claim 11, wherein the processor is configured to further execute instructions for bookmarking a third webpage, wherein when the third webpage is bookmarked, the processor is configured to execute instructions to display at least one identification information of identification information of the second webpage, identification information of the bookmarked first webpage, and identification information of the bookmarked third webpage.

15. The electronic device of claim 11, wherein the processor is configured to further execute instructions for bookmarking a first electronic document run by a view application, wherein when the first electronic document is bookmarked, the processor is configured to execute instructions to display at least one identification information of identification information of the second webpage, identification information of the bookmarked first webpage, and identification information of the bookmarked first electronic document.

16. The electronic device of claim 11, wherein the processor is configured to further execute instructions for bookmarking an image, wherein when the image is bookmarked, the processor is configured to execute instructions to display at least one identification information of identification information of the second webpage, identification information of the bookmarked first webpage, and identification information of the bookmarked image.

17. The electronic device of claim 11, wherein the processor is configured to further execute instructions for bookmarking a first file, wherein when the first file is bookmarked, the processor is configured to execute instructions to display at least one identification information of identification information of the second webpage, identification information of the bookmarked first webpage, and identification information of the first file.

18. The electronic device of claim 11, wherein the processor is configured to control the device to receive bookmarked information of a first electronic document from another electronic device, wherein when the bookmarked information is received, the processor is configured to execute instructions to display at least one identification information of identification information of the second webpage, identification information of the bookmarked first webpage, and identification information of the first electronic document.

19. The electronic device of claim 11, wherein the processor, when displaying the second webpage through the display after the first webpage is bookmarked, is configured to execute instructions to display the second webpage on a new tab of a first web browser being run the first webpage or a second web browser different from the first web browser.

20. The electronic device of claim 11, wherein the processor, in response to a fourth gesture on the bookmarked first webpage after the bookmarked first webpage is displayed, is configured to execute instructions to perform at least one of: move a position of the first webpage, change a size of the first webpage, or display a webpage connected to a link object included in the first webpage.

* * * * *